US012682264B2

(12) United States Patent
Mazzola

(10) Patent No.: US 12,682,264 B2
(45) Date of Patent: Jul. 14, 2026

(54) QUANTUM CALCULATING THERMALIZATION RATE AND BOLTZMANN SAMPLING

(71) Applicant: International Business Machines Corporation, Armonk, NY (US)

(72) Inventor: Guglielmo Mazzola, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1233 days.

(21) Appl. No.: 17/563,407

(22) Filed: Dec. 28, 2021

(65) Prior Publication Data

US 2023/0206100 A1     Jun. 29, 2023

(51) Int. Cl.
*G06N 10/20*          (2022.01)
*G06N 10/60*          (2022.01)

(52) U.S. Cl.
CPC ............. *G06N 10/20* (2022.01); *G06N 10/60* (2022.01)

(58) Field of Classification Search
CPC ............................... G06N 10/20; G06N 10/60
See application file for complete search history.

(56) References Cited

U.S. PATENT DOCUMENTS

| | | | |
|---|---|---|---|
| 8,140,467 B2 | 3/2012 | Kasai et al. | |
| 10,833,240 B2 | 11/2020 | Gumann et al. | |

| | | | |
|---|---|---|---|
| 10,833,384 B2 | 11/2020 | Gumann et al. | |
| 10,903,541 B2 | 1/2021 | Abdo et al. | |
| 2021/0104403 A1 | 4/2021 | Curran | |

FOREIGN PATENT DOCUMENTS

| | | |
|---|---|---|
| CN | 103020413 B | 1/2016 |
| JP | 2002373982 A | 12/2002 |
| JP | 5902495 B2 | 4/2016 |

OTHER PUBLICATIONS

F. Polotto, et al. Supersymmetric quantum mechanics method for the Fokker-Planck equation with applications to protein folding dynamics, Physica A: Statistical Mechanics and its Applications, vol. 493, pp. 286-300, ISSN 0378-4371 (Year: 2018).*

(Continued)

*Primary Examiner* — Andrew Caldwell
(74) *Attorney, Agent, or Firm* — Amin, Turocy & Watson, LLP

(57)          ABSTRACT

One or more systems, computer-implemented methods and/ or computer program products provided that can facilitate performing Boltzmann probability distribution sampling and determining a thermalization rate using quantum computing operations. A system can comprise a memory that stores computer-executable component, and a processor, operatively coupled to the memory, that executes computer-executable components. The computer-executable components can comprise a mapping component that maps a Fokker-Planck equation to a quantum problem comprising a first quantum operator, and a quantum computation component that, based on the mapping, second quantum operator as a function of a lowest eigenvalue of the first quantum operator, and wherein the quantum computation component further determines a thermalization rate as a function of the second quantum operator.

20 Claims, 12 Drawing Sheets

(56) References Cited

OTHER PUBLICATIONS

P. Pravatto et al. Quantum computing for classical problems: Variational Quantum Eigensolver for activated processes. New Journal of Physics. 23. 10.1088/1367-2630/ac3ff9 (Year: 2021).*

P. Pravatto et al., Dec. 9, 2021. GitHub. ppravatto/Smoluchowski-Rotor-Chain and ppravatto/Binary-VQE. (Year: 2021).*

D. Wang et al. Accelerated Variational Quantum Eigensolver, American Physical Society, 2019, doi 10.1103/PhysRevLett .122.140504 (Year: 2019).*

Nielsen et al., "Quantum Computation and Quantum Information: 10th Anniversary Edition" (Cambridge University Press, Cambridge, UK, 2010).

Peruzzo et al., "A variational eigenvalue solver on a photonic quantum processor," Nat. Commun. 5, 4213 (2014).

Chakrabarti et al., "A threshold for quantum advantage in derivative pricing," Quantum 5, 463 (2021).

Macridin et al., "Electron-Phonon Systems on a Universal Quantum Computer," Phys. Rev. Lett. 121, 110504 (2018).

Khoromskij "o(dlogn)-quantics approximation of n-d tensors in high-dimensional numerical modeling," Constr. Approx. 34, 257 (2011).

Lubasch et al., "Variational quantum algorithms for nonlinear problems," Phys. Rev. A 101, 010301(R) (2020).

Wecker et al., "Progress towards practical quantum variational algorithms," Phys. Rev. A 92, 042303 (2015).

Torlai et al., "Precise measurement of quantum observables with neural-network estimators," Phys. Rev. Res. 2, 022060(R) (2020).

Stokes et al., "Quantum natural gradient," Quantum 4, 269 (2020).

Straaten et al., "Measurement cost of metricaware variational quantum algorithms," PRX Quantum 2, 030324 (2021).

Abrams et al., "Quantum Algorithm Providing Exponential Speed Increase for Finding Eigenvalues and Eigenvectors," Phys. Rev. Lett. 83, 5162 (1999).

Benenti et al., "Quantum simulation of the singleparticle Schrodinger equation," Am. J. Phys. 76, 657 (2008).

Woerner et al., "Quantum risk analysis," npj Quantum Inf. 5, 15 (2019).

Cleve et al., "Quantum algorithms revisited, Proc. Royal Soc. London," Ser. A 454, 339 (1998).

Kitaev, "Quantum measurements and the Abelian stabilizer problem," arXiv:quant-ph/9511026.

Griffiths et al., "Semiclassical Fourier Transform for Quantum Computation," Phys. Rev. Lett. 76, 3228 (1996).

Mcardle et al., "Variational ansatz-based quantum simulation of imaginary time evolution," npj Quantum Inf. 5, 75 (2019).

Motta et al., "Determining eigenstates and thermal states on a quantum computer using quantum imaginary time evolution," Nat. Phys. 16, 205 (2020).

Vazquez et al., "Efficient State Preparation for Quantum Amplitude Estimation," Phys. Rev. Appl. 15, 034027 (2021).

Dellago et al., "Transition path sampling and the calculation of rate constants," J. Chem. Phys. 108, 1964 (1998).

Dellago et al., "Transition path sampling," Adv. Chem. Phys. 123, 1 (2002).

Chandler "Statistical mechanics of isomerization dynamics in liquids and the transition state approximation," J. Chem. Phys. 68, 2959 (1978).

D. G. Truhlar, B. C. Garrett, and S. J. Klippenstein, Current status of transition-state theory, J. Phys. Chem. 100, 12771 (1996).

Mazzola et al., "Fluctuations in the ensemble of reaction pathways," J. Chem. Phys. 134, 164109 (2011).

Faccioli et al., "Dominant Pathways in Protein Folding," Phys. Rev. Lett. 97, 108101 (2006).

Beccara et al., "Folding pathways of a knotted protein with a realistic atomistic force field," PLoS Comput. Biol. 9, e1003002 (2013).

Gidney et al., "Efficient magic state factories with a catalyzed |ccz to 2|t transformation," Quantum 3, 135 (2019).

Aleksandrowicz et al., "QISKIT: An open-source framework for quantum computing" (2019).

Wolff "Collective Monte Carlo Updating for Spin Systems," Phys. Rev. Lett. 62, 361 (1989).

Temme et al., "Quantum Metropolis Sampling" Oct. 4, 2010. arXiv:0911.3635 (32 pages).

Robert et al., "Resource-Efficient Quantum Algorithm for Protein Folding" Aug. 6, 2019. arXiv:1908.02163 (13 pages).

Hauke et al., "Dominant Reaction Pathways by Quantum Computing" Jan. 7, 2021. arXiv:2007.13788v2 (9 pages).

Metropolis et al., "Equation of State Calculation by Fast Computing Machines" The journal of chemical physics 21, 1087 (1953). 24 pages.

Earl et al., "Parallel Tempering: Theory, Applications, and New Perspectives" Physical Chemistry Chemical Physics 7, 3910 (2005). 21 pages.

Laio et al., "Escaping free-energy minima" Proceedings of the National Academy of Sciences 99, 12562 (2002). 5 pages.

Torrie et al., "Nonphysical sampling distributions in Monte Carlo free-energy estimation: Umbrella sampling" Journal of Computational Physics 23, 187 (1977). Volume 23, Issue 2. 13 pages.

Yung et al., "A quantum-quantum Metropolis algorithm" Proceedings of the National Academy of Sciences 109, 754 (2012). 6 pages.

Grover et al., "Creating superpositions that correspond to efficiently integrable probability distributions", arXiv preprint quant-ph/0208112 (2002). 2 pages.

Mazzola, "Sampling, rates, and reaction currents through reverse stochastic quantization on quantum computers" Physical Review A 104, 022431 (2021) 11 pages.

Allen et al., "Computer simulation of liquids" (Oxford university press, 2017). 8 pages.

Kirkpatrick et al., "Optimization by Simulated Annealing" science 220, 671 (1983). 11 pages.

Hastings "Monte Carlo Sampling Methods Using Markov Chains and Their Applications" Biometrika, vol. 57, No. 1 (Apr. 1970) 14 pages.

Beichl et al., "The Metropolis Algorithm" Computing in Science & Engineering 2, 65 (2000). 5 pages.

Huber et al., "Ecient Exact Sampling From the Ising Model Using Swendsen-Wang" Physical Review Letters 62, 361 (1989). 11 pages.

Swendsen et al., "Nonuniversal Critical Dynamics in Monte Carlo Simulations" Physical review letters 58, 86 (1987). 3 pages.

Dill et al., "The Protein-Folding Problem 50 Years On" Science 338, 1042 (2012). 7 pages.

Hanggi et al., "Reaction-rate theory: fifty years after Kramers" Reviews of modern physics 62, 251 (1990). 92 pages.

Betancourt "A Conceptual Introduction to Hamiltonian Monte Carlo" arXiv preprint arXiv:1701.02434 (2017). 60 pages.

Duane et al., "Hybrid Monte Carlo with AdaptiveTemperature in Mixed-CanonicalEnsemble: Efficient Conformational Analysis of RNA" Physics letters B 195, 216 (1987).

Laio et al., "Escaping fee-energy minima" Proceedings of the National Academy of Sciences 99, 12562 (2002). 5 pages.

Torrie et al., Nonphysical Sampling Distributions in Monte Carlo Free-Energy Estimation: Umbrella Sampling Journal of Computational Physics 23, 187-199 (1977) 13 pages.

Soklakov et al., "Efficient state preparation for a register of quantum bits" Physical review A 73, 012307 (2006). 26 pages.

Risken et al., Solution of the Quantum-Fokker-Planck Equation for Dispersive Optical Bistability in Terms of Matrix Continued Fractions 63{95 (1996).4 pages.

Parisi et al., "Perturbative theory without gauge fixing" Sci. sin 24, 483 (1981). 15 pages.

Tanase-Nicola et al., "Metastable states, transitions, basins and borders at finite temperatures Journal of StatisticalPhysics" 116, 1201 (2004). 42 pages.

Mell et al., "The NIST Definition of Cloud Computing," Recommendations of the National Institute of Standards and Technology, NIST Special Publication 800-145, Sep. 2011, 7 pages.

Landu et al., "A Guide to Monte Carlo Simulations in Statistical Physics" (Cambridge University Press, Cambridge, UK, 2014).

(56) References Cited

OTHER PUBLICATIONS

Sosso et al., "Crystal nucleation in liquids: Open questions and future challenges in molecular dynamics simulations," Chem. Rev. 116, 7078 (2016).

B. Cheng, G. Mazzola, C. J. Pickard, and M. Ceriotti, Evidence for supercritical behaviour of high-pressure liquid hydrogen, Nature (London) 585, 217 (2020).

Montanaro "Quantum speedup of Monte Carlo methods," Proc. Royal Soc. A 471, 20150301 (2015).

De Las Cuevas et al., "Quantum algorithms for classical lattice models," New J. Phys. 13, 093021 (2011).

Wocjan et al., "Speedup via quantum sampling", Phys. Rev. A 78, 042336 (2008).

Richter et al., "Quantum speedup of classical mixing processes," Phys. Rev. A 76, 042306 (2007).

Somma et al., "Quantum Simulations of Classical Annealing Processes," Phys. Rev. Lett. 101, 130504 (2008).

Wild et al., "Quantum sampling algorithms for near-term devices," arXiv:2005.14059.

Zalka "Simulating quantum systems on a quantum computer," Proc. Royal Soc. London, Ser. A 454, 313 (1998).

Wiesner "Simulations of many-body quantum systems by a quantum computer," arXiv:quant-ph/9603028.

Lemieux et al., "Efficient quantum walk circuits for Metropolis-Hastings algorithm," Quantum 4, 287 (2020).

Bertnstein et al., "Supersymmetry and the Bistable Fokker-Planck Equation," Phys. Rev. Lett. 52, 1933 (1984).

Weiss et al., "Incoherent tunneling in a double well," Phys. Rev. B 35, 9535 (1987).

Craig et al. "Quantum statistics and classical mechanics: Real time correlation functions from fing polymer molecular dynamics," J. Chem. Phys. 121, 3368 (2004).

Richardson et al., "Instanton calculations of tunneling splittings for water dimer and trimer," J. Chem. Phys. 135, 124109 (2011).

Mazzola et al., "Quantum Monte Carlo tunneling from quantum chemistry to quantum annealing," Phys. Rev. B 96, 134305 (2017).

Richardson et al., "Ring-polymer molecular dynamics rate theory in the deep-tunneling regime: Connection with semiclassical instanton theory," J. Chem. Phys. 131, 214106 (2009).

Becca et al., "Quantum Monte Carlo Approaches for Correlated Systems," 1st ed. (Cambridge University Press, Cambridge, UK, 2017).

Kassal et al., "Polynomial-time quantum algorithm for the simulation of chemical dynamics," Proc. Natl. Acad. Sci. USA 105, 18681 (2008).

Ollitrault et al., "Nonadiabatic Molecular Quantum Dynamics with Quantum Computers," Phys. Rev. Lett. 125, 260511 (2020).

Frenkel et al., "Understanding molecular simu-lation: from algorithms to applications", Academic Press, 1996, 658 pages, vol. 1.

* cited by examiner

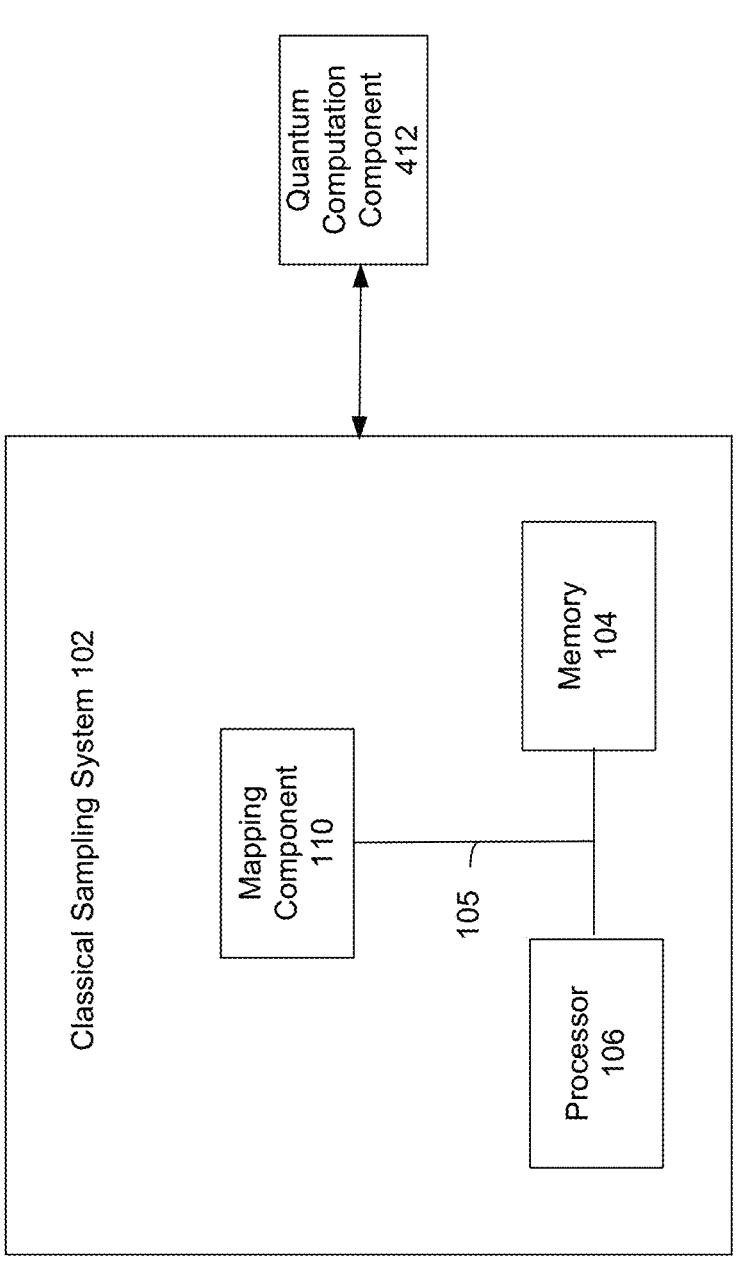
FIG. 1

FIG. 7

700

702 — Mapping, by a system operatively coupled to a processor, a Fokker-Planck equation to a quantum problem comprising a first quantum operator.

704 — Based on the mapping, determining, by the system, a second quantum operator as a function of a lowest eigenvalue of the first quantum operator.

706 — Determining, by the system, a thermalization rate as a function of the second quantum operator.

708 — Encoding, by the system, a continuous variable of a classical computing problem into a quantum register of a quantum computer, wherein an encoded continuous variable is generated based on the encoding, wherein the quantum problem is generated based on the encoded continuous variable applied to the quantum register, and wherein the quantum register comprises a group of qubits.

710 — Performing, by the system, a quantum computing operation on the encoded continuous variable in the quantum register, wherein the thermalization rate is determined based on the quantum computing operation performed on the encoded continuous variable.

712 — Determining, by the system, a quantum solution to the quantum problem based on the performing of the quantum computing operation on the encoded continuous variable, wherein the quantum solution comprises the thermalization rate.

714 — Determining, by the system, a solution to the classical computing problem based on the quantum solution related to the encoded continuous variable.

FIG. 8

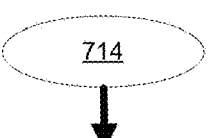

714

700

802 — Wherein the first quantum operator is an effective Hamiltonian, determining, by the system, a stationary solution of the Fokker-Planck equation as a ground state of the effective Hamiltonian, based on a connection between classical stochastic dynamics and a Schrodinger equation.

804 — Wherein the second quantum operator is a supersymmetric Hamiltonian that provides a supersymmetry-based ground state with the lowest eigenvalue based on the effective Hamiltonian, being the first quantum operator, and that provides the ground state, wherein the supersymmetric Hamiltonian is based on a supersymmetric quantum formulation of the Fokker-Planck equation, and wherein determining the thermalization rate comprises determining the thermalization rate as the ground state of the supersymmetric Hamiltonian, determining, by the system, a reaction rate constant and a saddle point of a reaction based on the supersymmetric Hamiltonian that provides the supersymmetry-based state with the lowest eigenvalue, wherein the reaction rate constant is a function of the thermalization rate.

806 — Loading, by the system, a defined ansatz using a variational process, wherein the defined ansatz is able to minimize a cost function given by an expectation value associated with the effective Hamiltonian in connection with sampling of a Boltzmann probability distribution and a second expectation value associated with the supersymmetric Hamiltonian in connection with the determining of the reaction rate constant, wherein the Boltzmann probability distribution is related to the quantum problem and a classical computing problem corresponding to the quantum problem, and wherein the stationary solution of the Fokker-Planck equation is the Boltzmann probability distribution.

808 — Sampling, by the system, a Boltzmann probability distribution related to the quantum problem and a classical computing problem corresponding to the quantum problem based on the supersymmetric Hamiltonian that provides the supersymmetry-based ground state with the lowest eigenvalue and based on an encoded continuous variable that is associated with the classical computing problem and is applied to a quantum register of a quantum computer, wherein the stationary solution of the Fokker-Planck equation is the Boltzmann probability distribution.

812 — Determining, by the system, a first estimation of a quantum solution to the quantum problem based on the sampling of the Boltzmann probability distribution and the thermalization rate.

FIG. 9

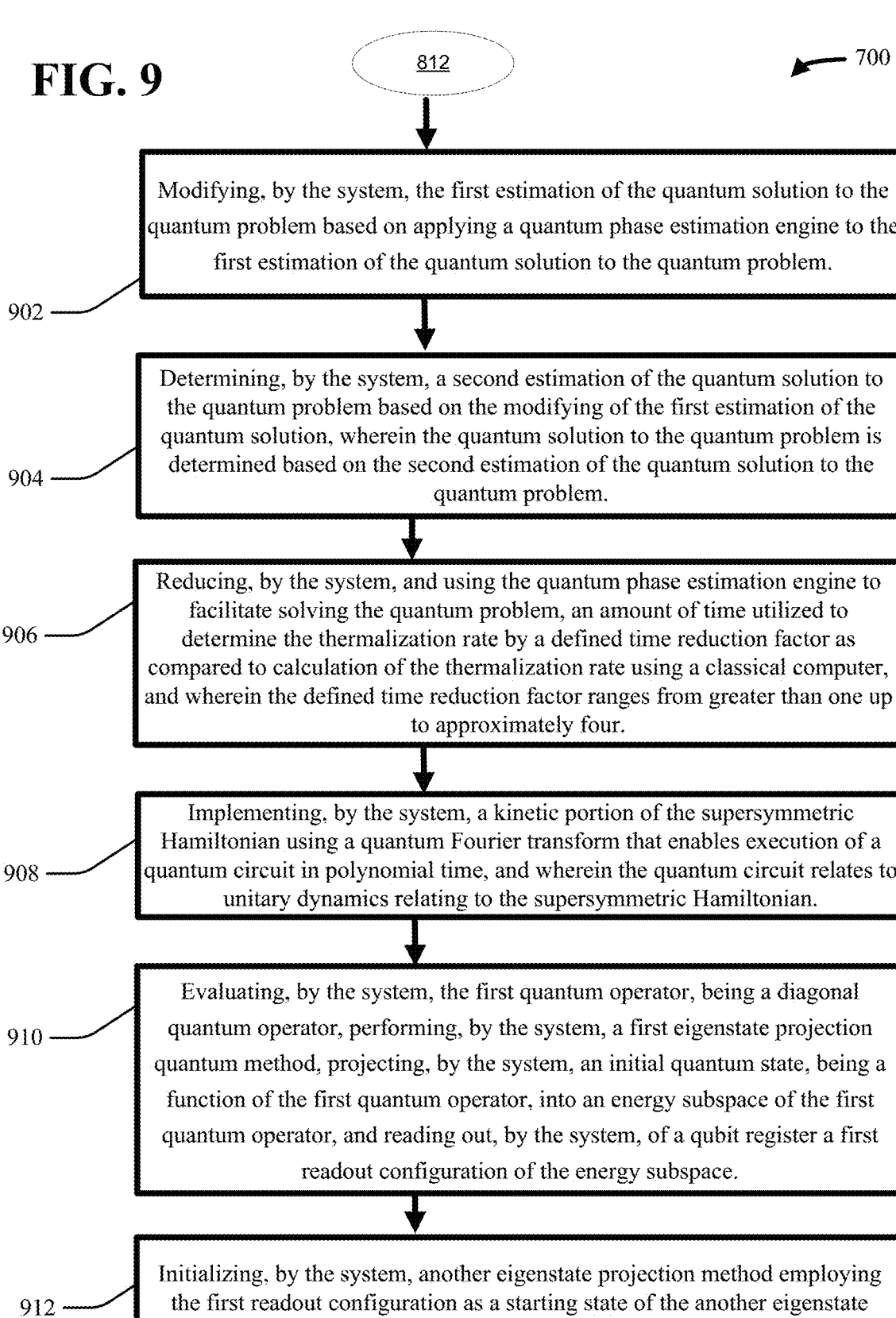

812

700

Modifying, by the system, the first estimation of the quantum solution to the quantum problem based on applying a quantum phase estimation engine to the first estimation of the quantum solution to the quantum problem.

902

Determining, by the system, a second estimation of the quantum solution to the quantum problem based on the modifying of the first estimation of the quantum solution, wherein the quantum solution to the quantum problem is determined based on the second estimation of the quantum solution to the quantum problem.

904

Reducing, by the system, and using the quantum phase estimation engine to facilitate solving the quantum problem, an amount of time utilized to determine the thermalization rate by a defined time reduction factor as compared to calculation of the thermalization rate using a classical computer, and wherein the defined time reduction factor ranges from greater than one up to approximately four.

906

Implementing, by the system, a kinetic portion of the supersymmetric Hamiltonian using a quantum Fourier transform that enables execution of a quantum circuit in polynomial time, and wherein the quantum circuit relates to unitary dynamics relating to the supersymmetric Hamiltonian.

908

Evaluating, by the system, the first quantum operator, being a diagonal quantum operator, performing, by the system, a first eigenstate projection quantum method, projecting, by the system, an initial quantum state, being a function of the first quantum operator, into an energy subspace of the first quantum operator, and reading out, by the system, of a qubit register a first readout configuration of the energy subspace.

910

Initializing, by the system, another eigenstate projection method employing the first readout configuration as a starting state of the another eigenstate projection method.

912

QUANTUM CALCULATING THERMALIZATION RATE AND BOLTZMANN SAMPLING

FIELD OF INVENTION

Quantum computing is generally the use of quantum-mechanical phenomena to perform computing and information processing functions.

BACKGROUND

The quest for improved sampling methods to solve statistical mechanics problems of physical and chemical interest is of desire, such as where classical computations are exceedingly difficult, where classical computations take undesired time and/or where such problems cannot be solved classically, e.g., employing a classical system, such as a classical computer system.

Differently, quantum computing has potential to solve problems that, due to computational complexity, cannot be solved or can only be solved slowly on a classical computer. Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products can facilitate a process to perform Boltzmann probability distribution sampling and to determine a thermalization rate using quantum computing operations. That is, classical computations can be solved using a quantum computer, such as by employing modified classical calculations in the quantum realm, to thus achieve a quantum calculation advantage relative to a classical problem.

In accordance with an embodiment, a system can comprise a memory that stores computer-executable components, and a processor, operatively coupled to the memory, that executes computer-executable components. The computer-executable components can comprise a mapping component that maps a Fokker-Planck equation to a quantum problem comprising a first quantum operator, and a quantum computation component that, based on the mapping, determines the second quantum operator as a function of a lowest eigenvalue of the first quantum operator, and wherein the quantum computation component further determines a thermalization rate as a function of the second quantum operator.

In accordance with another embodiment, a computer-implemented method can comprise mapping, by a system operatively coupled to a processor, a Fokker-Planck equation to a quantum problem comprising a first quantum operator. The method further can comprise, based on the mapping, determining, by the system, a second quantum operator as a function of a lowest eigenvalue of the first quantum operator, and determining, by the system, a thermalization rate as a function of the second quantum operator.

In accordance with another embodiment, a computer program product, for facilitating performing Boltzmann probability distribution sampling and determining a thermalization rate using quantum computing operations can comprise a computer readable storage medium having program instructions embodied therewith. The program instructions can be executable by a processor to cause the processor to map, by the processor, a Fokker-Planck equation to a quantum problem comprising a first quantum operator. The program instructions can be executable by the processor to further cause the processor to, based on the mapping, determine, by the processor, a second quantum operator as a function of a lowest eigenvalue of the first quantum operator, and determine, by the processor, a thermalization rate as a function of the second quantum operator.

An advantage of the system, computer-implemented method and/or computer program product can be that the classical Boltzmann sampling can be employed to solve a classical problem, modified as a quantum problem, in the quantum realm. That is, using a quantum computer and/or quantum engine, and based on a connection between classical statistical problems and one or more equations, such as the Schrodinger equation, a classical problem can be solved more quickly and/or even at all. The solution and the method to solution can be more efficient, and/or constants computed can be more accurate.

In one or more embodiments of the system, computer-implemented method and/or computer program product, the second quantum operator can be a supersymmetric Hamiltonian that provides a supersymmetry-based ground state with the lowest eigenvalue based on the effective Hamiltonian, being the first quantum operator, and that provides the ground state, wherein the supersymmetric Hamiltonian can be based on a supersymmetric quantum formulation of the Fokker-Planck equation, and wherein determining the thermalization rate can comprise determining the thermalization rate as the ground state of the supersymmetric Hamiltonian. An advantage can be that a thermalization rate can be computed more quickly employing quantum advantage.

In one or more embodiments of the system, computer-implemented method and/or computer program product, such can comprise determining, by the system, a reaction rate constant and a saddle point of a reaction based on the supersymmetric Hamiltonian that provides the supersymmetry-based state with the lowest eigenvalue, wherein the reaction rate constant is a function of the thermalization rate. An advantage can be that a saddle point and reaction rate constant can be computed more quickly employing quantum advantage.

In one or more embodiments of the system, computer-implemented method and/or computer program product, such can comprise loading, by the system, a defined ansatz using a variational process, wherein the defined ansatz is able to minimize a cost function given by an expectation value associated with the effective Hamiltonian in connection with sampling of a Boltzmann probability distribution and a second expectation value associated with the supersymmetric Hamiltonian in connection with the determining of the reaction rate constant, wherein the Boltzmann probability distribution is related to the quantum problem and a classical computing problem corresponding to the quantum problem, and wherein the stationary solution of the Fokker-Planck equation is the Boltzmann probability distribution. An advantage can be that a thermalization rate can be computed more quickly employing quantum advantage and using a classical Boltzmann probability distribution.

In one or more embodiments of the system, computer-implemented method and/or computer program product, such can comprise evaluating, by the system, the first quantum operator, being a quantum operator, performing, by the system, a first eigenstate projection quantum method, projecting, by the system, an initial quantum state, being a function of the first quantum operator, into an energy subspace of the first quantum operator, reading out, by the system, of a qubit register a first readout configuration of the energy subspace, and initializing, by the system, another eigenstate projection method employing the first readout configuration as a starting state of the another eigenstate projection method. An advantage of this can be achievement of an algorithmic tunneling and overcoming a cost function energy barrier, by employing a Hamiltonian quantum operator.

In accordance with yet another embodiment, a computer-implemented method can comprise evaluating, by a system operatively coupled to a processor, a classical cost function comprising a quantum operator, wherein the quantum operator is a function of the classical cost function or comprises the classical cost function. The computer-implemented can further comprise performing, by the processor, and by employing a quantum system, an eigenstate projection that projects an initial quantum state into an energy subspace of the quantum operator.

An advantage of this computer-implemented can be an ability to read out a qubit register of the quantum system after the performance of the eigenstate projection. The read-out of the qubit register in binary format can encode a configuration relating to the respective computational space, therefore allowing realization of a quantum-powered and efficient trial update, such as to evaluate a desired portion of the configuration space, e.g., a basin and local minima of the cost function. A read-out configuration can be initialized in the quantum register and can be employed as a starting state of a subsequent eigenstate projection quantum method, such as for one or more additional readout iterations. After a desired (and cost-function dependent) number of iterations, a one or more desired configurations in the computational space can have been visited.

In one or more embodiments of the computer-implemented method where the quantum operator comprises the classical cost-function, the quantum operator can be complemented by a generic non-diagonal quantum operator. The role of the non-diagonal quantum operator can be to enhance a possibility to escape local minima and a particular form of the non-diagonal quantum operator can be determined as to maximize the efficiency of the whole procedure.

DESCRIPTION OF THE DRAWINGS

The technology described herein is illustrated by way of example and not limited in the accompanying figures.

FIG. 1 illustrates a block diagram of an example, non-limiting system that can facilitate performing Boltzmann probability distribution sampling and determining a thermalization rate using quantum computing operations, in accordance with one or more embodiments described herein.

FIG. 7 illustrates a process diagram of another method of performing Boltzmann probability distribution sampling and determining a thermalization rate using quantum computing operations, in accordance with one or more embodiments described herein.

FIG. 8 illustrates a continuation of the process diagram of FIG. 7 of the method of performing Boltzmann probability distribution sampling and determining a thermalization rate using quantum computing operations, in accordance with one or more embodiments described herein.

FIG. 9 illustrates a process diagram of a continuation of FIGS. 7 and 8 of the method of performing Boltzmann probability distribution sampling and determining a thermalization rate using quantum computing operations, in accordance with one or more embodiments described herein.

DETAILED DESCRIPTION

Figure 2:
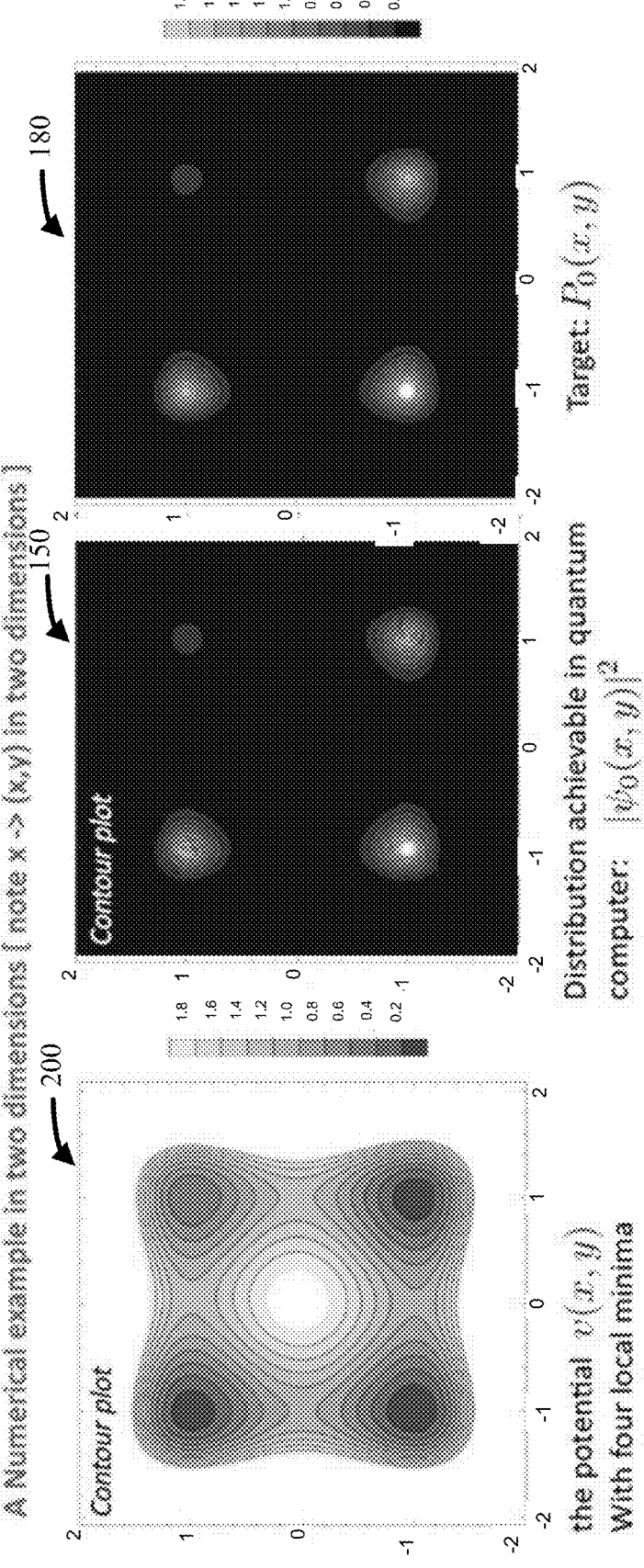
FIG. 2 provides set of graphs demonstrating that a quantum distribution provided by one or more embodiments described herein matches a classical distribution of a classical problem on which a quantum problem providing the quantum distribution is based, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. However, in various cases, that the one or more embodiments can be practiced without these specific details.

Improved sampling methods can be desired for the solution of classical problems, such as statistical mechanics problems of physical and/or chemical interest. For example, one such problem can be a desire to understand thermally activated rare-event processes between long-lived meta-stable states, such as protein folding. In such case, both finite-temperature canonical distribution function and reaction current between reactant and product states can be desired to completely characterize the dynamic.

In connection therewith, sampling methods can slow, such as critically, during sampling performance, such as in the presence of complex energy landscapes during optimization of spin glasses, neural networks, and protein folding. These classical problems can be difficult or impossible to solve using classical methods.

One such sampling scheme can be sampling from a multidimensional finite-temperature Boltzmann probability distribution, p(x), which can be a central problem in numerical simulations of physics, chemistry and non-traditional sciences. For example, in optimization by in optimization by simulated annealing, a physical potential can be replaced by a suitable cost function, and the temperature can become an effective parameter than can decrease during the optimization.

Another exemplary sampling scheme can be found in the realm of molecular dynamics, being a local-update-based sampling scheme. Such scheme can fail when the potential displays several local minima separated by large barriers. These conditions can be ubiquitous in structural phase transitions and conformal reactions in solutions, such as the protein folding problem or neurodegenerative disease problems. In such cases, a simulation initialized in one minimum can rarely spontaneously visit other minima, as such rate process can involve the occurrence of a thermally activated rare event.

In another example related to a Markov chain, subsequent states can be highly correlated because in a Markov chain, new states can be generated by modifying the previous ones. That is, in a Monte Carlo simulation, for example, after a system has been thermally equilibrated, measurements can only be taken every T steps, which can be defined as autocorrelation time. Autocorrelation times can diverge in presence of complex energy landscapes, as indicated above. That is, classical Monte Carlo sampling can be inefficient.

More generally, dynamics that are characterized by a timescale gap between fast local relaxations and slow activation processes can be difficult to simulate. These conditions can arise in systems in the realms of physics, chemistry, material science and biology, not to be limiting.

In one or more cases, an efficient and practical sampling scheme can be desired to explore a large configuration space and/or to escape local minima of a potential v(x). The v(x) can be a chemical energy surface or a cost function for an optimization problem, for example. Small average displacements x to x' can lead to an increased acceptance rate, yet samples can become statistically correlated, such that a classical central processing unit (CPU) time can be wasted in generating similar configurations without improvement in an estimate. In contrast, a highly nonlocal proposal move can be employed to decorrelate this walk, but such generally implies a low acceptance rate, such that most of the computational time can be spent in proposing transitions x to x' which can be non-accepted.

To address one or more of the aforementioned deficiencies, one or more embodiments described herein can perform a quantum computing simulation of a continuous variable diffusion process.

Quantum computation can utilize a qubit as its essential unit instead of a classical computing bit. A qubit (e.g., quantum binary digit) is a quantum-mechanical analog of a classical bit. Whereas classical bits can employ only one of two basis states (e.g., 0 or 1), qubits can employ superpositions of those basis states (e.g., $\alpha|0\rangle + \beta|1\rangle$), where $\alpha$ and $\beta$ are complex scalars (such that $|\alpha|^2+|\beta|^2=1$), allowing several qubits to theoretically hold exponentially more information than the same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, or similar binary-type state measure. Qubits, partaking of the quantum mystique, can occupy a superposition of 0 and 1 states. It is not that the qubit can have an intermediate value, such as 0.63; when the state of the qubit is measured, the result is either 0 or 1. But in the course of a computation, a qubit can act as if it were a mixture of states, for example: 63% 0 and 37% 1.

Indeed, general quantum programs can employ coordination of quantum and classical parts of a computation. One way to contemplate general quantum programs is to identify processes and abstractions involved in specifying a quantum algorithm, transforming the algorithm into executable form, running an experiment or simulation, and analyzing the results. A notion throughout these processes is use of intermediate representations. An intermediate representation (IR) of computation is neither its source language description nor target machine instructions, but something in between. Compilers can utilize several IRs during a process of translating and optimizing a program. An input is a source code describing a quantum algorithm and compile time parameter(s). An output is a combined quantum/classical program expressed using a high-level IR. A distinction between quantum and classical computers is that the quantum computer is probabilistic, thus measurements of algorithmic outputs provide a proper solution within an algorithm specific confidence interval. Computation is repeated until a satisfactory probable certainty of solution can be achieved.

By processing information using laws of quantum mechanics, quantum computers can offer novel ways to perform computation tasks such as molecular calculations, optical photons, optimization, and many more. Many algorithms and system components can be introduced to perform such computational tasks efficiently.

One or more goals of quantum performance relative to solution of a classical problem, such as employing a classical sampling scheme, can be to propose a quantum algorithm to unbiasedly sample from a canonical finite-temperature distribution p(x) and to compute the thermalization rate k, together with the reaction current j(x), which together can be desired pieces of information to model reactive processes. Another goal can be to study a possible origin of quantum speedup in visiting a configuration space, such as to escape local minima, such as with global quantum updates.

One or more embodiments described herein can reduce a runtime of a simulation for classical sampling and can compute a related thermalization rate, such that realistic chemical-physical systems can be accessed. A digital quantum computer can be employed to enable calculations based on a classical algorithm. Such problem can be different from a "loading of state" task, in that a normalization constant Z can be unknown, since the calculation of such normalization constant can include an intractable multi-dimensional integration. Long algorithm sequences can be employed, such as of Markov chain Monte Carlo algorithms, to thus be able to obtain precise estimates of statistical quantities. Further, a larger area of a potential energy landscape can be explored and/or evaluated relative to a shorter runtime.

That is, one or more embodiments described herein propose an enhances sampling scheme for classical sampling by employing a quantum system (e.g., employing a quantum processor and one or more real-world, physical qubits).

To that end, the one or more embodiments described herein relate to techniques for providing quantum circuit obfuscation at different levels, such as relative to an input state specification, one or more gate parameters, and/or even a portion of or an entire quantum circuit. These different processes can be employed separately and/or in combination.

Generally, a connection between classical stochastic dynamics and the Schrodinger equation, referred to as stochastic quantization, can be employed to variationally prepare quantum states, allowing for unbiased sampling form a classical Boltzmann distribution. That is, stochastic quantization can be employed to determine a stationary solution of a Fokker-Planck equation as the ground state of an effective Hamiltonian (H), which can be prepared using a quantum computer, using quantum phase estimation (QPE). A quantum state prepared can allow for the unbiased sampling from a classical Boltzmann distribution.

An advantage of QPE can be that it employs $O(1/\varepsilon)$ applications of $e^{(-i\,H'\,dt)}$ to learn its eigenphase within error $\varepsilon$ with high probability. This can be quadratically better than bounds on the variance that can result from computing a thermalization rate using existing classical sampling. Indeed, quantum advantage of such sampling scheme (e.g., according to one or more embodiments described herein) can be quadratic, such as having a defined time reduction factor ranging from greater than about one to about four.

Further, a reaction rate constant, transition state of a reaction as the lowest eigenvalue and/or an eigenstate of an effective quantum operator being a modified Hamiltonian (H', such as a supersymmetric Hamiltonian) can be obtained, such as from a supersymmetric quantum formulation of the Fokker-Planck equation. A reaction rate constant can be computed as a ground-state energy of suitably transformed operators, such as following supersymmetric extension of the formalism.

Additionally, a hybrid quantum-classical sampling scheme to escape local minima and to explore a larger portion of a configuration space (e.g., than existingly enabled) can be provided, such as absent assuming existence of oracles or quantum walk operators.

For example, it can be desired to sample from an unnormalized Boltzmann distribution at finite temperature T, on a system defined by a multidimensional coordinate x, and a potential v, where the system can be represented by Equation i:

$$e^{-v(x)/T}, \tag{i}$$

And where a normalization constant Z, represented by Equation ii is unknown:

$$Z = \int dx\, e^{-v(x)/T}. \tag{ii}$$

Generally, a thermalization constant or relaxation constant can be calculated, where $\lambda$ that controls the time scale at with a fraction of products $n_p$ can transform into reactants, as represented by Equation iii:

$$n_P(t) = n_P^{eq}\left(1 - e^{-\lambda t}\right). \tag{iii}$$

In Equation iii, $n_p^{eq}$ can be the equilibrium fraction of the products, where the products and reactants can be assumed as being interconvertible as in standard conditions. It is noted that products and reactants can be associated to a non-chemical system, such as a system or model displaying bi-stable states.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. However, in various cases, that the one or more embodiments can be practiced without these specific details.

Generally, the subject computer processing system(s), methods, apparatuses, devices and/or computer program products can be employed to solve new problems that can arise through advancements in technology, computer networks, the Internet and the like.

Figure 4:
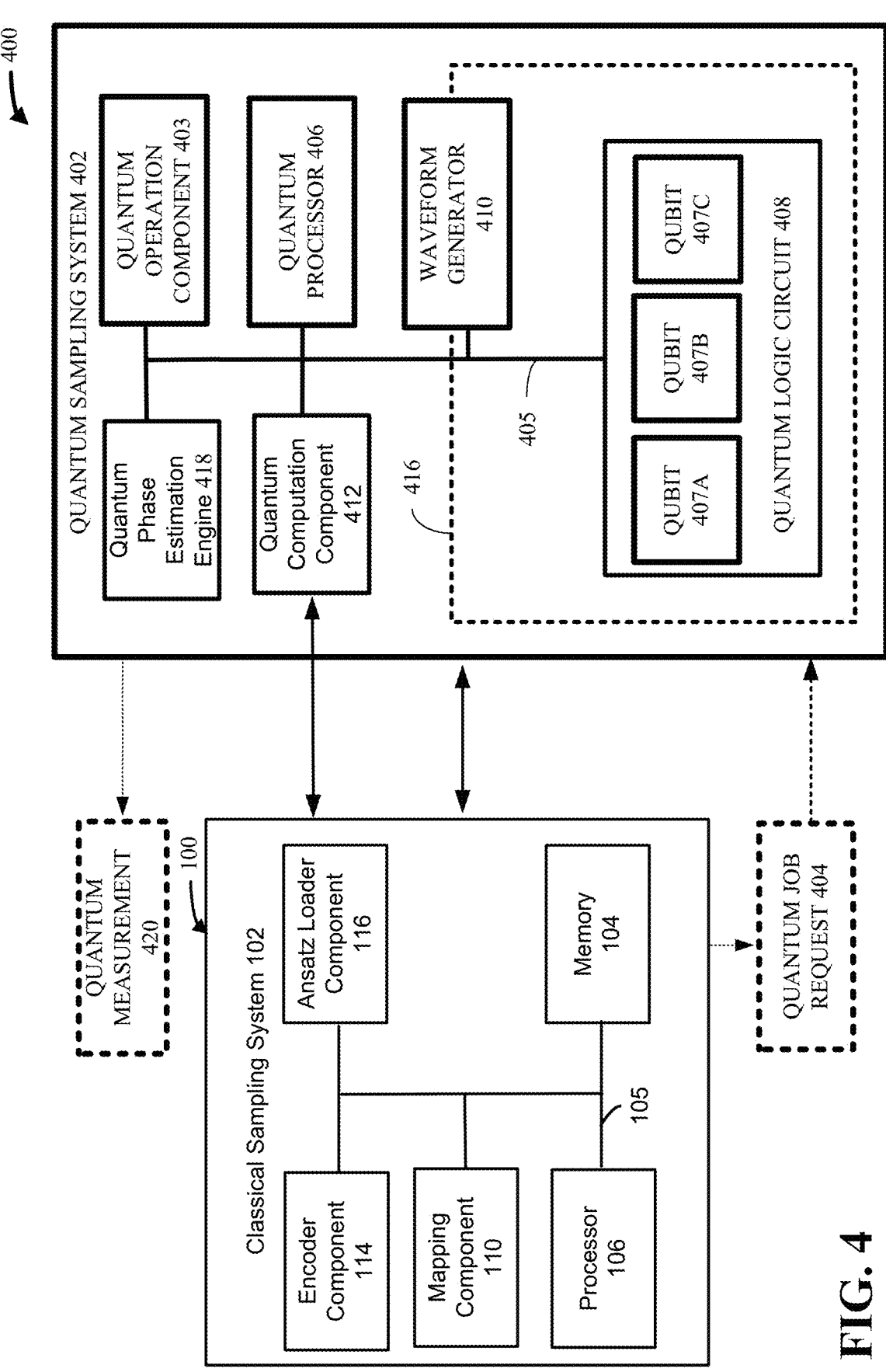
FIG. 4 illustrates a block diagram of another example, non-limiting system that can facilitate performing Boltzmann probability distribution sampling and determining a thermalization rate using quantum computing operations, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, the non-limiting system 400 as illustrated at FIG. 4, and/or systems thereof, can further comprise, be associated with and/or be coupled to one or more computer and/or computing-based elements described herein with reference to an operating environment, such as the operating environment 1100 illustrated at FIG. 11. In one or more described embodiments, computer and/or computing-based elements can be used in connection with implementing one or more of the systems, devices, components and/or computer-implemented operations shown and/or described in connection with FIG. 1, FIG. 4 and/or with other figures described herein.

Turning first generally to FIG. 1, one or more embodiments described herein can include one or more devices, systems and/or apparatuses that can facilitate performing Boltzmann probability distribution sampling and determining a thermalization rate using quantum computing operations. For example, FIG. 1 illustrates a block diagram of an example, non-limiting system 100 that can provide one or more of the following operations: mapping between a Fokker-Planck equation and an effective quantum problem, calculation of a thermalization rate as a function of a lowest eigenvalue of an effective quantum operator, encoding of a classical problem to a quantum register and/or solution of such effective quantum problem using quantum computers.

Generally, the non-limiting system can map a Fokker-Planck equation to a quantum problem comprising a first quantum operator, and based on the mapping, can determine a second quantum operator as a function of a lowest eigenvalue of the first quantum operator. Further, the non-limiting system 100 can determine a thermalization rate as a function of the second quantum operator.

A definition of the first quantum operator and the second quantum operator can thus be result of classical precomputation. Both can stem from the original problem function. Precomputing these operators can be based on a solution of the eigenvalue equation that the operators define, which eigenvalue equation can be computationally hard, for which the computation of the eigenvalue equation can be processed at a respective quantum computer.

The specific form of these operators then implies a defined quantum circuit and/or specific set of operations that involve quantum circuit executions and measurements.

In one or more embodiments, the classical sampling system 102 can comprise a processor 106 (e.g., computer processing unit, microprocessor, classical processor, quantum processor and/or like processor). In one or more embodiments, any component associated with classical sampling system 102, as described herein with or without reference to the one or more figures of the one or more embodiments, can comprise one or more computer and/or machine readable, writable and/or executable components and/or instructions that can be executed by processor 106 to facilitate performance of one or more processes defined by such component(s) and/or instruction(s). In one or more embodiments, the processor 106 can comprise the mapping component 110 and/or quantum computation component 412 (so-named due to operation to generate a quantum computation, as compared to performing a quantum computation, and thus can be a classical component).

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory. For example, the processor 106 can perform various operations that can be specified by such computer and/or machine readable, writable, and/or executable components and/or instructions including, but not limited to, logic, control, input/output (I/O), arithmetic, and/or the like. The processor 106 can comprise one or more central processing unit (CPU), multi-core processor, microprocessor, dual microprocessors, microcontroller, System on a Chip (SOC), array processor, vector processor, quantum processor, and/or another type of processor. Such examples of the processor can be employed to implement any embodiments described herein.

In one or more embodiments, the classical sampling system 102 can comprise a computer-readable memory 104 that is operably connected to the processor 106. The memory 104 can store computer-executable instructions that, upon execution by the processor 106, can cause the processor 106 and/or other components of the classical sampling system 102 (e.g., the mapping component 110 and/or quantum computation component 412) to perform one or more acts. In one or more embodiments, the memory 104 can store computer-executable components (e.g., the mapping component 110 and/or quantum computation component 412).

The memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of the memory 104 can be employed to implement any one or more embodiments described herein.

The classical sampling system 102 and/or a component thereof as described herein can be communicatively, electrically, operatively, optically and/or otherwise coupled to one another via a bus 105 to perform functions of non-limiting system 100, classical sampling system 102 and/or any components thereof and/or coupled therewith. Bus 105 can comprise one or more of a memory bus, memory controller, peripheral bus, external bus, local bus, quantum bus and/or another type of bus that can employ one or more bus architectures. One or more of these examples of bus 105 can be employed to implement any one or more embodiments described herein.

In addition to the processor 106 and/or memory 104 described above, classical sampling system 102 can comprise one or more computer and/or machine readable, writable and/or executable components and/or instructions that, when executed by processor 106, can facilitate performance of one or more operations defined by such component(s) and/or instruction(s).

In one or more embodiments, classical sampling system 102 can be coupled (e.g., communicatively, electrically, operatively, optically and/or like function) to one or more external systems, sources and/or devices (e.g., classical and/or quantum computing devices, communication devices and/or like devices), such as via a network. In one or more embodiments, one or more of the components of the non-limiting system 100 can reside in the cloud, and/or can reside locally in a local computing environment (e.g., at a desired location(s)).

In one or more embodiments, the classical sampling system 102 can be coupled (e.g., communicatively, electrically, operatively, optically, etc.) to one or more external systems, sources, and/or devices (e.g., classical and/or quantum computing devices, communication devices, etc.) via a network. The network can comprise one or more wired and/or wireless networks, including, but not limited to, a cellular network, a wide area network (WAN) (e.g., the Internet), and/or a local area network (LAN). For example, the classical sampling system 102 can communicate, such as via the controller/processor 106, with one or more external systems, sources, and/or devices, for instance, computing devices using the network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, classical sampling system 102 can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between the classical sampling system 102 and external systems, sources, and/or devices (e.g., computing devices, communication devices, etc.).

Turning now to the other components of the non-limiting system 100, classical sampling system 102, further operation of the classical sampling system 102 will be described.

Generally, the mapping component 110 can employ any suitable method to map a Fokker-Planck equation to a quantum problem comprising a first quantum operator. The first quantum operator of the quantum problem can be a Hamiltonian, such as represented by Equations 5A, 5B and/or 5C, provided below.

For example, a stationary solution of a Fokker-Planck (FP) equation can be a time-dependent Boltzmann probability distribution $P_0(x)$, based on Equation 1 provided below. The probability density distribution $P(x,t)$ for the stochastic process x(t) generated by a first order Langevin equation can satisfy the Fokker-Planck equation of Equation 1.

$$\frac{\partial P(x,t)}{\partial t} = -\frac{\partial (f(x)P(x,t))}{\partial x} + k_B T \frac{\partial^2 P(x,t)}{\partial x^2}.$$ [1]

In Equation 1, f(x) is a force, such as a negative derivative of the potential v(x).

Indeed, the stationary solution of this stochastic differential equation can be the desired equilibrium probability density p(x).

Turning now to bridging a classical statistical mechanics with an effective quantum problem, the FP equation has a relationship to the Schrodinger equation. This relationship can be obtained by searching for a solution, in view of a relationship between the FP equation and the Schrodinger equation, such as by plugging in an ansatz of Equation 2:

$$P(x,t)=\psi_0(x)\Psi(x,t),$$ [2]

where Equation 3:

$$\psi_0(x)=\sqrt{P_0(x)}$$ [3]

can result in a time equation, such as imaginary time Equation 4 (Schrodinger Equation 4):

$$\frac{\partial}{\partial t}\Psi(x,t) = -H\Psi(x,t).$$ [4]

At Equation 4, $\Psi(x,t)$ can satisfy the Schrodinger Equation 4 in imaginary time, where H can be an effective Hamiltonian. In view of Equation 4, the effective Hamiltonian can be represented by Equations 5A, 5B and 5C:

$$H = K + V,$$ [5A]

$$K = -k_B T \frac{\partial^2}{\partial x^2}, \text{ and}$$ [5B]

$$V = \frac{1}{4k_B T}\left(\frac{\partial v(x)}{\partial x}\right)^2 - \frac{1}{2}\frac{\partial^2 v(x)}{\partial x^2}.$$ [5C]

At Equations 5, $k_B$ is the Boltzmann constant, which can be set to unity, such as using appropriate unit of measure.

That is, the mapping component 110 can provide the aforementioned mapping to a quantum problem, outputting the quantum problem and the effective Hamiltonian.

From theory, it can be understood that a ground state of the effective Hamiltonian can be represented via Equation 6:

$$\psi_0(x)=\sqrt{P_0(x)},$$ [6]

with eigenvalue $E_0=0$. That is, a second quantum operator, being a supersymmetric Hamiltonian, can be provided as a function of a ground state of the effective Hamiltonian having a lowest eigenvalue. This connection can be referred to as a reverse stochastic quantization where classical stochastic process can be mapped into quantum formalism, such as into a quantum evolution in imaginary time, to eventually be solved on a quantum computing machine.

As a result, one-to-one mapping can be provided between a classical potential surface v(x) (and a temperature T) and an effective quantum operator H.

Turning briefly to FIG. 2, a set of three plots 200, 250 and 280 are illustrated. Plot 200 depicts a model classical potential energy function v. Plot 250 shows the Boltzmann distribution that can be achieved using the quantum computer, while plot 280 shows the target. The two distributions match. That is, the aforementioned conversion of the classical problem to a quantum problem can be readily achieved.

Still referring to FIG. 1, the illustrated classical sampling system 102 also can determine a thermalization rate as a function of another quantum operator, being a modified Hamiltonian, or particularly, a supersymmetric Hamiltonian. Indeed, this transformation from the effective Hamiltonian to a supersymmetric Hamiltonian can be determined by the quantum computation component 412, and as such, can transform a classical problem into a quantum-based problem for solving via a quantum computer. That is, in connection with the mapping component 110, and/or in response to the mapping of the Fokker-Planck equation to a quantum problem, the quantum computation component 412 can be operated. The quantum computation component 412 can be a quantum-based component, such as functioning in connection with a quantum computer, such as embodied by a quantum sampling system 402 (FIG. 4).

In greater detail, additional information can be extracted from a spectrum of H. A gap between a fundamental and first excited state $\Delta=E_1-E_0=E_1$ can provide a relaxation time toward the equilibrium distribution, which can be a dominant timescale at which a physical process can take place. Since the Hamiltonian H defines a ground state with a zero eigenvalue, $H^S$ can be constructed being a supersymmetric Hamiltonian, such that a ground state $E_0^S$ of $H^S$ can provide a fundamental gap of H. For example, considering a one-dimensional potential, Equation 7:

$$H^S=K+V^S$$ [7]

can be readily obtained by adding a second derivative of v to the effective potential V, resulting in Equation 8, in one dimension:

$$V^S = V + \frac{\partial^2 v(x)}{\partial x^2}.$$ [8]

Further, a generalization to a multidimensional case can be straightforward. That is, a ground state energy $\Delta$ of Hamiltonian Equations 5 (e.g., 5A, 5B and 5C), with the modification of Equation 8 in Equation 5c can give a thermalization rate, that in the case of bi-stable potentials v(s) can be the reaction rate.

Before going further, now turning to FIG. 3, the one-dimensional double-well model will be discussed. A valid one-dimensional potential can read as Equation 9 and can feature two local minima at positions $\pm x_0$, separated by an energy barrier with height h.

$$v(x) = h(x^2 - x_0^2)^2$$ [9]

If T<<h, the hopping process can become a thermally activated rare event, which rate can be described by Kramer's theory (e.g., Equation 10), $$k \approx \frac{\omega_{x_0}\omega_0}{2\pi}e^{-k/T}.$$ [10]

where $\omega_x$ and $\omega_0$ can be the characteristic frequencies of the harmonic approximation of the potential at the bottom $x=x_0$ and at the barrier $x=0$. A timescale $1/k$ can represent a relaxation time of any local update Markov chain simulations. A fully ergodic simulation can be achieved if both wells are visited multiple time (one each, to the very least) during the simulation.

The effective potentials V (x) and V S (x) can be constructed and the associated Schrodinger equations can be solved. In FIG. 3 at plot 300 these potentials and the first seven eigenfunctions of Equation 5a are plotted. The two lowest lying states are the symmetric and antisymmetric combinations of the two distributions localized at the left and the right wells, namely $\psi 0(x)=1/\sqrt{2}[\Psi L (x)+\psi R(x)]$ and $\psi 1(x)=1/\sqrt{2}[\psi L(x)-\psi R(x)]$. The energy gap $\Delta$ separating these two states decreases exponentially with the inverse temperature and the height of the potential energy barrier, in agreement with Equation 10, while the gap between the first and the second excited states remains O(1) (see also FIG. 3, plot 380). This numerically confirms that the gap of Equation 5a, or equivalently the ground-state energy $E_0{}^S$ of the supersymmetric version of Equation 5a gives the thermalization rate of the system at finite temperature.

Additionally, despite a Schrodinger equation being solves, the rate obtained is one corresponding to a purely classical thermally activated process, and not to a quantum tunneling event. In FIG. 3, plot 350, it is numerically demonstrated that $|\psi_0(x)"^2=\rho(x)$.

Figure 3:
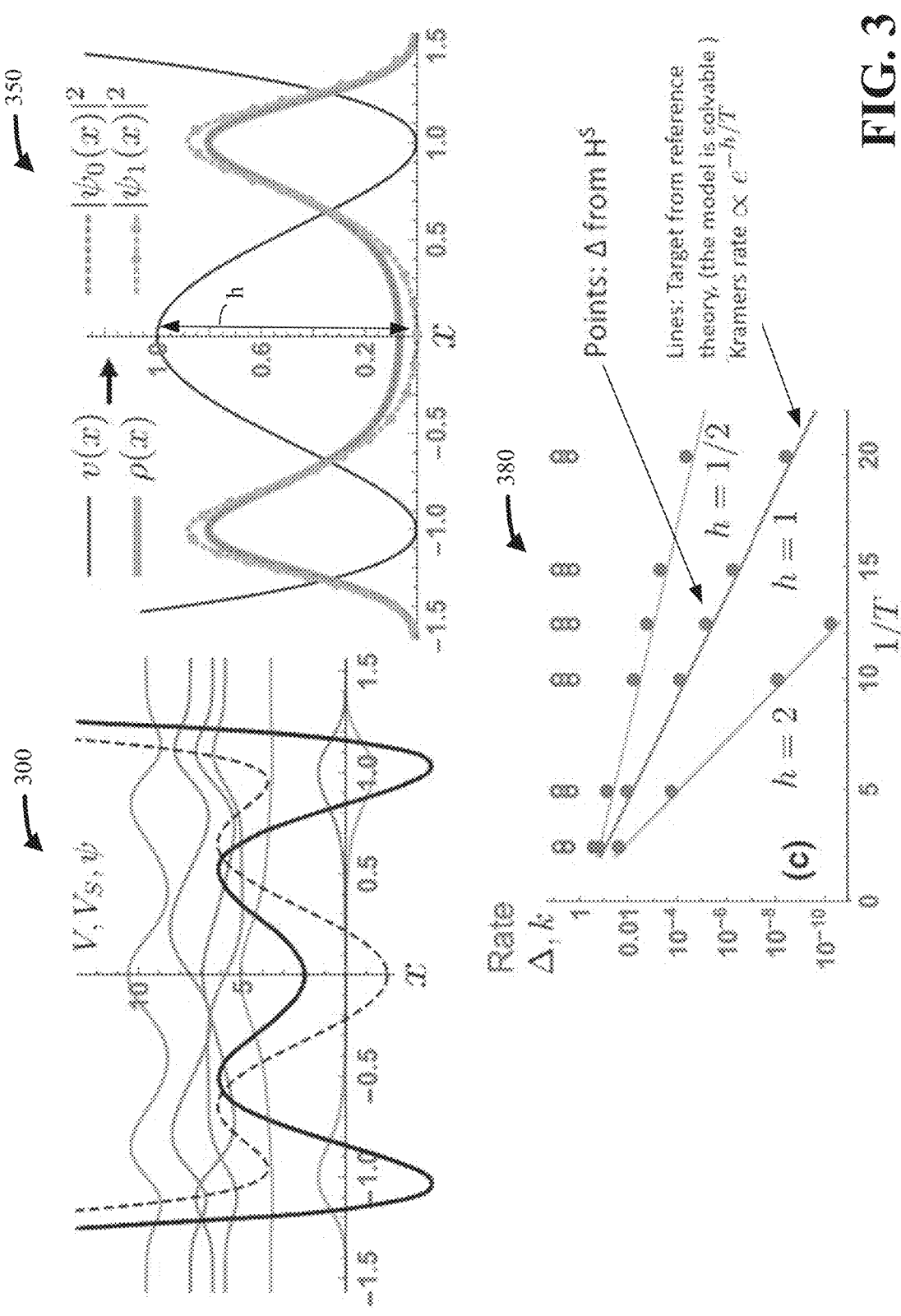
FIG. 3 illustrates a set of plots demonstrating double well potential of a solution to a quantum problem determined, in accordance with one or more embodiments described herein.

Particularly at FIG. 3, plot 300 illustrates shapes of the effective potentials $V(x)$ (thick solid black) and $V^S(x)$ (dashed black), and the first seven eigenfunctions (light colored) $\psi i (x)$ of the operator H (Equation 5a) with $v(x)$ given by Equation 9 and T=0.2. Each curve is shifted vertically by the corresponding eigenvalue $E_i$. The vertical axis units are dimensionless units for the potentials as well for the wave functions. At FIG. 3, plot 350 illustrates $v(x)$ given by Equation 9 (black line), the square modulus of the first two eigenstates (dashed and dot-dashed lines), and the classical probability distribution $\rho(x)$ defined by Equation iii and T=0.2 (thick red line). At FIG. 3, plot 380 illustrates energy gaps of H between the ground state and the first excited state (solid markers) and between the first and the second excited states (empty markers) as a function of the inverse temperature, and for three different choices of the potential parameter h. Solid lines correspond to the Kramer rate of Equation 10.

Turning next to FIG. 4, one or more embodiments described herein can include one or more devices, systems and/or apparatus that can facilitate obfuscation of a quantum circuit and execution of the quantum circuit as one or more quantum operations to facilitate output of one or more quantum results. For example, FIG. 4 illustrates a block diagram of an example, non-limiting system 400 that can secure a quantum circuit while still enabling execution of the quantum circuit relative to a quantum logic circuit including one or more qubits.

The illustrated non-limiting system 400 can include both a quantum portion (e.g., the quantum sampling system 402) and a classical portion (e.g., the classical sampling system 102). The non-limiting system 400 thus can be a hybrid system. In one or more other embodiments, the quantum sampling system 402 can be separate from, but function in combination with, the non-limiting system 100 and/or the classical sampling system 102.

Relative to the non-limiting system 100 and/or the classical sampling system 102, repetitive description of like elements employed in other embodiments described herein is omitted for sake of brevity.

The quantum sampling system 402 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 420, can be responsive to the quantum job request 204 and associated input data and can be based at least in part on the input data, quantum functions and/or quantum computations.

In one or more embodiments, the quantum sampling system 402 can comprise one or more quantum components, such as a quantum operation component 403, a quantum processor 406, a waveform generator 410, a quantum phase estimation engine 418 and/or a quantum logic circuit 408 comprising one or more qubits (e.g., qubits 407A, 407B and/or 407C).

The quantum processor 406 can be any suitable processor. The quantum processor 406 can generate one or more instructions for controlling the one or more processes of the quantum operation component 403 and/or for controlling the quantum logic circuit 408 and/or waveform generator 410. In one or more embodiments, the quantum processor 406 can comprise the quantum logic circuit 408.

The quantum operation component 403 can obtain (e.g., download, receive, search for and/or the like) a quantum job request 404 requesting execution of one or more quantum programs. The quantum operation component 403 can determine one or more quantum logic circuits, such as the quantum logic circuit 408, for executing the quantum program.

The quantum job request 404 can include a quantum circuit provided by the non-limiting system 100 and/or classical sampling system 102 based below-described encoding to a quantum register, for example. The request 404 can be provided in any suitable format, such as a text format, binary format and/or another suitable format. In one or more embodiments, the request 404 can be received by a component other than a component of the quantum sampling system 402, such as a by a component of a classical system coupled to and/or in communication with the quantum sampling system 402, such as the classical sampling system 102.

The waveform generator 410 can perform one or more quantum processes, calculations and/or measurements for operating one or more quantum circuits on the one or more qubits 407A, 407B and/or 407C. For example, the waveform generator 410 can operate one or more qubit effectors, such as qubit oscillators, harmonic oscillators, pulse generators and/or the like to cause one or more pulses to stimulate and/or manipulate the state(s) of the one or more qubits 407A, 407B and/or 407C comprised by the quantum sampling system 402. That is, the waveform generator 410, such as in combination with the quantum processor 406, can execute operation of a quantum logic circuit on one or more qubits of the circuit (e.g., qubit 407A, 407B and/or 407C). In response, the quantum operation component 403 can output one or more quantum job results, such as one or more quantum measurements 420, in response to the quantum job request 404.

The quantum logic circuit 408 and a portion or all of the waveform generator 410 can be contained in a cryogenic environment, such as generated by a cryogenic chamber 416, such as a dilution refrigerator. Indeed, a signal can be generated by the waveform generator 410 within the cryogenic chamber 416 to effect the one or more qubits 407A-C. Where qubits 407A, 407B and 407C are superconducting qubits, cryogenic temperatures, such as about 4K or lower can be employed to facilitate function of these physical qubits. Accordingly, the elements of the quantum measurement circuit 110 also are to be constructed to perform at such cryogenic temperatures.

One or more communications between one or more components of the non-limiting system 400 and the classical system 100 can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLU-ETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Turning now to the classical sampling system 102, as discussed above with respect to FIG. 1, the mapping component 110 and quantum computation component 412 can be employed for state-preparation operations, such as to prepare a Boltzmann distribution function pertaining to a classical cost function v(x) in a quantum register. Such method can be considered, in one or more embodiments, as an initial block for other quantum algorithms that may employ the state-preparation operations. For example, one can employ quantum amplitude estimation and compute expectation values of classical operators, over this state, with a speedup that can be quadratic over classical MC sampling.

The encoder component 114 and ansatz loader component 116 can further be employed with respect to encoding of the prepared quantum problem (that is based on the aforementioned classical problem) into a quantum register and with respect to loading a defined ansatz for purposes of configuration exploration and/or quantum solution estimation. Indeed, calculation of a thermalization rate (as at least a portion of the quantum solution) can be provided. Quantum advantage can be quadratic and provided at least in part due to the thermalization rate being a number that can be computed with quantum phase estimation (QPE).

For example, generally, the encoder component 114 can encode a continuous variable of a classical computing problem into a quantum register of a quantum computer, where an encoded continuous variable can be generated based on the encoding, where the quantum problem can relate to the classical computing problem, where the quantum problem can be generated based on the encoded continuous variable applied to the quantum register, and where the quantum register can comprise a group of qubits.

For example, generally, the ansatz loader component 116 can load a defined ansatz using a variation process, where the defined ansatz can facilitate mitigating a cost function given by a first expectation value associated with the effective Hamiltonian in connection with sampling of a Boltzmann probability distribution and a second expectation value associated with the supersymmetric Hamiltonian in connection with the determining of a reaction rate constant. The Boltzmann probability distribution can be related to the quantum problem and a classical computing problem that corresponds to the quantum problem, and the stationary solution of the Fokker-Planck equation can be the Boltzmann probability distribution.

For example, the quantum computation component can sample a Boltzmann probability distribution related to the quantum problem and a classical computing problem that corresponds to the quantum problem based on the supersymmetric Hamiltonian that provides the supersymmetry-based ground state with the lowest eigenvalue and based on an encoded continuous variable that is associated with the classical computing problem and is applied to a quantum register of a quantum computer, wherein the stationary solution of the Fokker-Planck equation is the Boltzmann probability distribution, and the quantum computation component determines a first estimation of a quantum solution to the quantum problem based on the sampling of the Boltzmann probability distribution and the thermalization rate.

The quantum computation component 412 can employ the quantum phase estimation engine 418 that can refine the first estimation of the quantum solution to the quantum problem, based on the first estimation of the quantum solution to the quantum problem and a quantum phase estimation function, where the quantum phase estimation engine 418 can determine a second estimation of the quantum solution to the quantum problem based on the refining of the first estimation of the quantum solution, where the second estimation can enhance accuracy of estimation of the quantum solution over the first estimation, and where the quantum computation component 412 can determine the quantum solution to the quantum problem based on the second estimation of the quantum solution to the quantum problem.

That is, as will be explained below in detail, additional steps of the framework are to propose novel quantum computing implementations to make use of this formalism, as well as to discuss avenues for quantum advantage in all these specific applications.

First, however, it is not the case that Equation 5a can be solved with classical quantum Monte Carlo (QMC) methods. Given that the shape of this effective potential v(x) is even more corrugated compared to the original one, v(x), such approach would inherit all the sample complexity of the MC sampling on the original v(x). The one or more embodiments discussed herein can avoid such deficiency.

For example, employing the encoder component 114, the non-limiting system illustrated at FIG. 4 can encode a continuous variable by discretizing the space represented by Equation 11:

$$x_i = -w + i\Delta x, \tag{11}$$

where 2w is the maximum range allowed for the coordinate, $i = 0, \ldots 2^n - 1$, and $\Delta x = 2w/2^n$. For each coordinate an n qubit register is to be employed. A resolution at which the space is represented increases exponentially with n, and therefore the qubit resource requirement needed to encode the system alone, grows linearly with the system size. Additional ancilla qubits can be employed to compute the exp($-I$ V(x) dt) part of the determined quantum circuit. This number can increase polynomially, for a polynomial function V(x). Therefore, the problem can be encoded efficiently in a quantum register.

Indeed, one can determine a convenient representation of the quantum problem and its mapping to a qubit register (e.g., quantum register). A real-space representation can be used, and the space can be discretized using a grid of $2^n$ points, where n is the number of qubits. Without loss of generality, a finite domain $x \in [-L/2, L/2]$ can be considered. A position of a particle in the qubit register can be denoted by an integer $i \in [0, 2^n-1]$, which can be connected to the real-valued physical coordinate through the relation $x_i = -L/2 + i \times L/2^n$. The qubit register size n to represent each degree of freedom can scale logarithmically with the precision, and therefore this encoding can be efficient memory-wise. The multidimensional case employ adding one qubit register per dimension d, such that, for a system made of $N_p$ particles, a total memory can scale as $N_p d$.

Bra-ket notation $|\psi\rangle$ denotes a quantum state stored in a qubit register and $\psi(x)$ to indicate a wave function in real space. These two objects can be similar, with the difference being that the squared amplitudes of first quantum state are normalized to one, whereas the normalization of the second is given by a continuous space integral. There can be, however, an obvious metric factor $2^n/L$ that can connect the two measures.

Concerning the problem Hamiltonians H and $H^S$ respectively, the encoding can depend on the selectively determined quantum primitive. to solve the effective quantum problems, an ansatz can be loaded, such as by the ansatz loader component 116 of the classical sampling system 102. The ansatz loader component 116 can load a defined ansatz using a variational process. The variational process can be aimed to minimize a cost function given by the expectation value of the Hamiltonian Equations 5a-5c and Equation 4 for respective sampling and rate problems.

The cost of preparing such a state can be non-considered. Rather, it can be assumed that a physical motivate ansatz with an overlap with ground state can be prepared, also using classical methods. The ground state is not loaded exactly. The exact ground state, rather, can be obtained using either VQE, as indicated above, or using a quantum phase estimation (QPE) engine, such as the quantum phase estimation engine 418 of the quantum sampling system 402 (FIG. 4). Via the VQE route, an expectation value of the Hamiltonian in the first quantization can be evaluated using only two basis (no need for Pauli decomposition), namely the one where the position operator is diagonal and the one where the momentum is diagonal, to compute the kinetic operator K. Alternatively, via the QPE route, The circuit for $e^{(iHt)}$ can be executed in polynomial time, because the operator in Equation 5b can be implemented using a Quantum Fourier Transform (QFT), while a polynomial or piecewise functional fit of the potential in in Equation 5c can be determined.

That is, in one example, one can prepare the ground states of these operators by means of a variational approach, the variational quantum eigensolver (VQE). In such case, the cost function to minimize is the energy of the Hamiltonian H of Equation 5a for the task of preparing the p(x) distribution or the energy of the modified operator $H^S$ (Equation 8) that can provide the reaction rate, as discussed above relative to Equation 8.

These Hamiltonians, which are made of a potential operator diagonal in the computational basis, and a kinetic operator, can be evaluated in two bases, absent decomposing the Hamiltonian as a sum of Pauli strings, which decomposed number can exponentially increase with the problem size.

Figure 5:
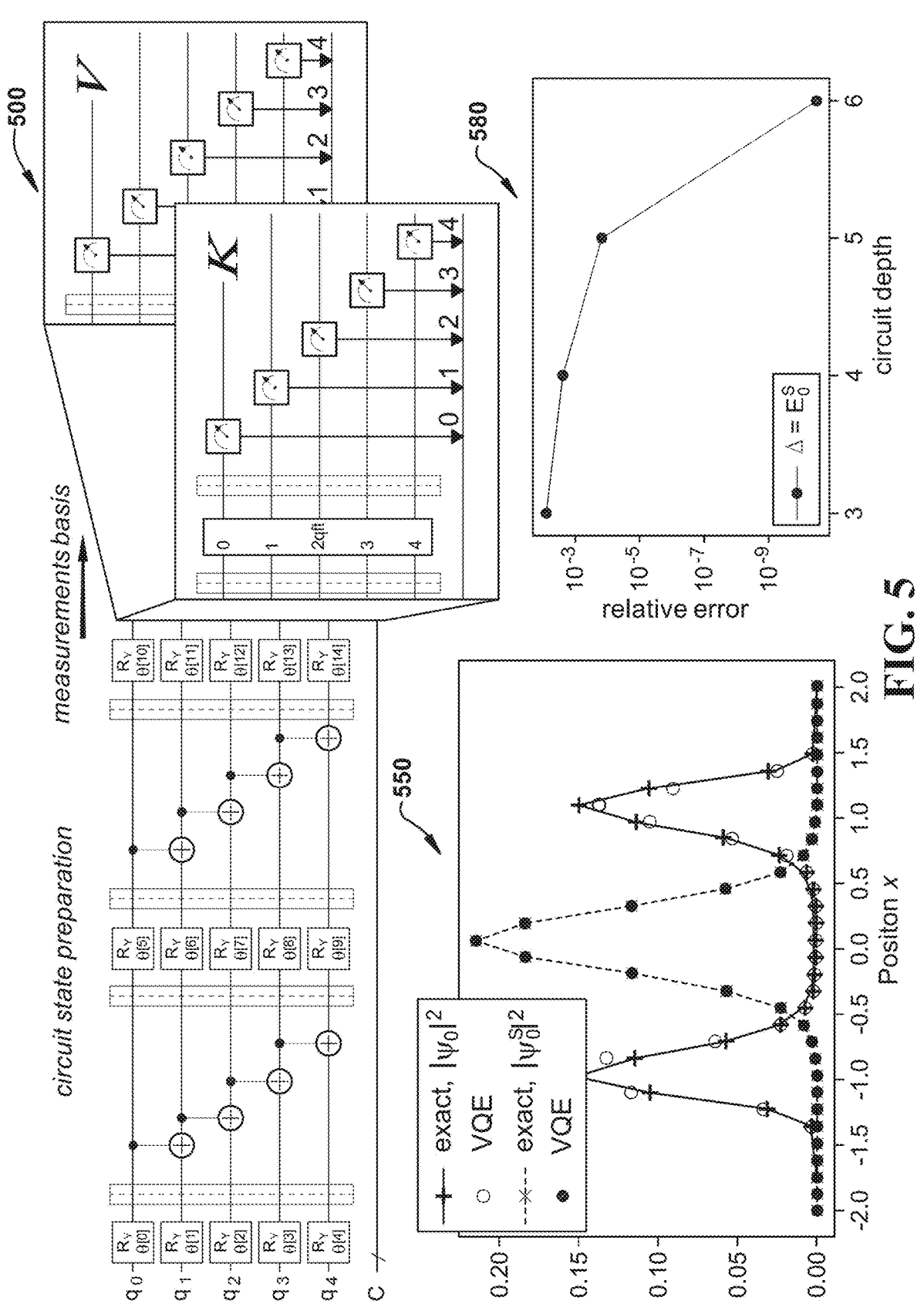
FIG. 5 illustrates a set of plots demonstrating sampling and rate in a double well potential of a solution to a quantum problem determined, in accordance with one or more embodiments described herein.

The variational approach can employ a parametrized quantum circuit, which parameters can be optimized to minimize the target cost function. In FIG. 5, plot 500 a possible choice of such parametrized circuit is illustrated, being the RY-CNOT ansatz, that features RY and CNOT gates, and can produce a real-valued quantum state. This circuit can produce exponentially-accurate Gaussian distributions as the circuit depth is increased. Other circuits used to approximate solution of a Schrodinger equation on a grid can include a Hamiltonian variational inspired ansatz or a matrix product state ansatz. The latter circuit can represent the solution of a nonlinear Schrodinger equation on a grid, using an exponentially fewer number of resources compared to the classical counterpart.

Irrespective of the ansatz and the Hamiltonian encoding used, the number of circuit repetitions to accumulate sufficient statistic and resolve a target energy accuracy E can scale with $1/\epsilon^2$. Furthermore, the shot noise also can have an impact on optimization schemes like the quantum natural gradient method, which can be employed to optimize quantum circuits featuring a large number of parameters.

As a consequence, as indicated above, a second method to find such ground states can employ a quantum phase estimation (QPE) algorithm, such as via QPE engine 418 (FIG. 4). QPE can employ the possibility to perform controlled application of powers of the unitary $U = e^{iHt}$. A quantum circuit can be provided to perform the time evolution primitive $U \approx e^{iKt} e^{iVt}$, for a finite time t, with operators given by Equation 8 or by Equation 2, by using a Trotter time discretization. The QPE algorithm can allow for obtaining a digital representation of the phase $E_0 t$, if $|\psi 0\rangle$ is taken as the input of the QPE module. In one or more realistic cases, the input state $|u\rangle$ will not be exactly $|\psi 0\rangle$, yet, when measuring the phase, $|u\rangle$ can collapse into an exact eigenstate $|\psi n\rangle$ of H and $|u\rangle$ can give its energy $E_n$. In this case, the success probability of getting $E_0$ can be given by $|\langle u|\psi 0\rangle|^2$.

The circuit for generating the unitary U can be composed of two repeating blocks. The kinetic part $e^{iKt}$ can be performed in polynomial time using a quantum Fourier transform. With respect to the "effective" potential part $e^{iVt}$ ($e^{iV(s)t}$), not every function can be evaluated exactly in polynomial time. However, polynomial and piecewise polynomial functions can fall within this class. Moreover, also the Coulomb and the Lennard-Jones potentials can be evaluated.

More generally, because an efficient classical algorithm to compute the potential function V(x) can be provided, an efficient quantum circuit also can be provided. This can allow for approximating a function V(x) with arbitrarily good precision efficiently in term of run time and qubit register size, such as where ancilla registers can be employed to perform the computation.

For example, in the quantum Fourier transform based approach to QPE, an additional evaluation register can be employed to operate the QPE algorithm. This can feature $n_\epsilon + \log_2(2 + \frac{1}{2}\epsilon)$ to obtain the output phase with $n_\epsilon$ precision bits, and an overall success probability of the algorithm, $1 - \epsilon$. The error in estimating the energy scales as $1/(n_\epsilon t)$, as $n_\epsilon$ controls the total number of applications of U(t).

Next, with respect to a canonical sampling problem employing the above, one can employ the quantum-to-classical connection discussed above to solve the associated quantum stationary problem represented by Equation 12:

$$H\psi(x) = E_0\psi(x), \qquad [12]$$

where $E_0=0$ for the ground state and $\psi 0=\psi 0=\sqrt{P_0}$. This means that sampling from $|\psi_0|^2$ allows for sampling from the canonical distribution at finite T. An advantage of this framework can be that we can obtain in principle certified samples. A sample x can be discarded if the corresponding energy value is $E_0=0$. In the variational approach, once the quantum circuit has been optimized as to reach the cost function $E_0=0$, one or more (rescaled) readouts in the computational basis $|i>$ can be accepted, and the direct sampling method from the discretized quantum state, represented by Equation 13:

$$|\psi_0\rangle = \sum_i^{2^x-1} \psi_0[i]|i\rangle \qquad [13]$$

can provides an optimal correlation time as each sample can be statistically independent (e.g., independent wave function collapses). In FIG. 5, plot 550, an example VQE optimization providing $|\psi_0|^2$ for the double-well potential.

Alternatively, a QPE algorithm can be used to achieve exact sampling, such as more exact sampling, from $\psi_0(x)$. In such case, $\epsilon < \Delta$ is set to have sufficient $n_\epsilon$ bits to resolve an energy difference of $\Delta$, and therefore project the time-evolved state into $\psi_0$ as the phase is measured.

Also, while in the standard QFT-based implementation the total circuit depth can scale with $1/\epsilon$, the energy scale targeted for exact sampling can be given by the gap $\Delta$, that in turn can vanish exponentially with the system size and inverse temperature.

Referring generally to FIG. 5 again, the plots 500, 550 and 580 are further defined herein. These plots illustrate sampling and rate in the double-well model from VQE. Plot 500 illustrates the circuit used to implement the VQE algorithm. The first part is the standard parametrized circuit to create the variational form. Here the RY-CNOT ansatz is employed, with linear connectivity. Plotted is a circuit with a depth of two entangling blocks. The second part is used to measure the expectation value of the Hamiltonian and is therefore system dependent. In such case, the potential term (V) can be evaluated by measuring directly in the computational basis, while a QFT gate can be employed before the kinetic term (K) can be read out. At plot 550 of FIG. 5, illustrated are distributions $|\psi_0(x)|^2$ (blue, double-peaked) and $|\psi_0^S(x)|^2$ (red, single peaked) that can be obtained with VQE from the same potentials $V(x)$ and $V^S(x)$ as at FIG. 4, plot 400, i.e., calculated from the physical potential $v(x)$ with h=1, and T=0.2). A quantity of n=5 qubits can be employed (i.e., 32 grid points), which can be a smallest number that can allow for retrieving the continuous limit value for the rate and a circuit depth of four blocks. The thermalization rate is obtained as ground-state energy $E_0^S$, corresponding to the supersymmetric version of H (e.g., $H^S$). The vertical axis units are dimensionless units for the potentials as well for the wave functions. Illustrated at FIG. 5, plot 580, is a converge of $E_0^S$ as a function of the expressibility of a variational ansatz, defined as the depth of the quantum circuit. The relative error can be given as $(E(VQE)-E_{exact})/E_{exact}$, and can achieve a satisfactory value of $\approx 10-3$ with depth of about four repeating blocks.

Turning now to determination of reaction rate constants and saddle points of a reaction based on the supersymmetric Hamiltonian, further discussion is provided.

Generally, a reaction rate constant can be a function of the thermalization rate determined as the ground state of the supersymmetric Hamiltonian. A kinetic portion of the supersymmetric Hamiltonian can be implemented using a quantum Fourier transform that can enable execution of a quantum circuit in polynomial time, and wherein the quantum circuit can relate to unitary dynamics relating to the super-symmetric Hamiltonian.

For example, the quantum calculation of classical rate can follow similar ideas as discussed above. The difference is that, here, interest can be in the ground-state energy $E_0^S$, which can give the reaction rate k, rather than sampling from the corresponding ground state $\psi_0^S(x)$. Moreover, being variational, the method can provide an upper bound to the calculated thermalization rate. Going further, the probability density $|\psi_0^S(x)|^2$ that can be sampled using a quantum computer can be localized on the saddle points of the effective potential, which can approximately give the transitions states for a given conformal reaction specified by the classical cost function. This information can be useful to prepare an initial starting point for the procedure, which can be an input either for a variational or QPE-based quantum algorithm. At FIG. 5, an example VQE optimization providing $|\psi_0^S|^2$ is illustrated, as well as $E_0^S$ for the double-well potential. In particular, accuracy of the result can improve exponentially with the ansatz quantum circuit graph, as illustrated.

Moreover, the reaction current $j(x)$ can be retrieved as Equation 14:

$$j(x) = \sqrt{\rho}(x)\Psi_0^S(x) = \Psi_0(x)\Psi_0^S(x), \qquad [14]$$

where $\psi_0(x)$ can be prepared using methods described above.

Further calculation of the reaction rate as ground-state energy of an effective quantum Hamiltonian using the QPE engine component 418 can offer a quadratic speedup compared to the related classical method that relies on sampling. In the quantum case, the circuit depth to reach a target error can scale with $1/n_\epsilon$, where $n_\epsilon$ is the number of applications of the unitary circuit, while in the classical case it scales as $1/M$, where M is the sampling duration.

Figure 6:
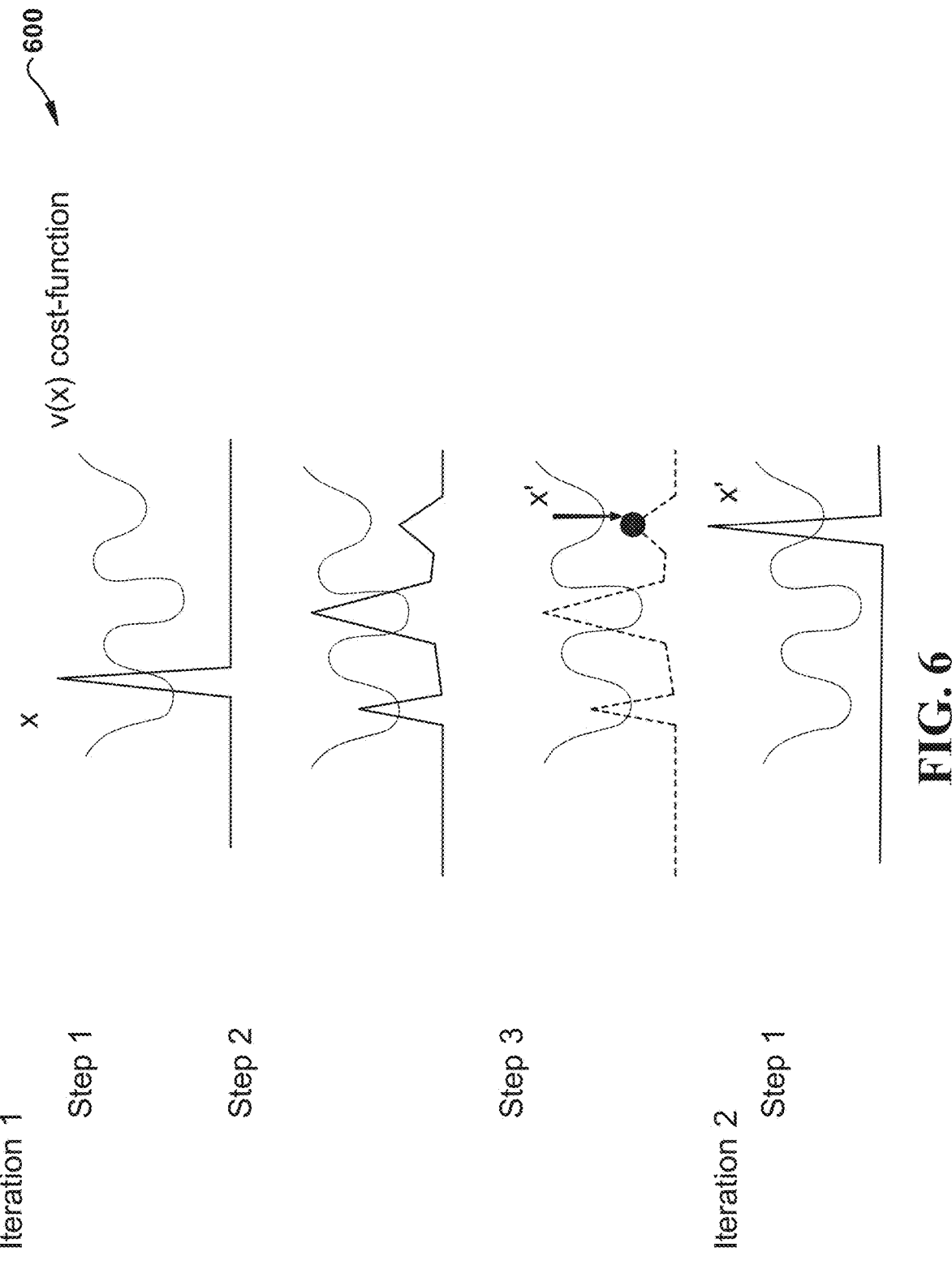
FIG. 6 illustrates a set of plots demonstrating quantum global update steps, in accordance with one or more embodiments described herein.

Turning now to FIG. 6 and associated description, minima hopping via quantum global updates is described in detail. That is, another possible avenue for quantum advantage in exploring potential energy surfaces can feature several deep local minima. A hybrid approach can be employed, where the task of accurately sampling the partition function at the various local minima can be efficiently performed using a classical Markov chain MC, while the task of generating effective, global T (x, x') proposal can move to the left to the quantum part of the algorithm. In this way, use of the quantum processing unit (QPU) wall time can be efficient.

Generally, minima hopping via quantum global updates can employ a potential energy landscape function $v(x)$ that is the classical problem aimed to be solved above, such as relative to description of FIGS. 1 and 2. A non-diagonal operator can be employed that can be the kinetic operator K, although being non-limiting.

Generally, such minima hopping via quantum global updates can comprise evaluating, by the system, the first quantum operator, performing, by the system, a first eigenstate projection quantum method, projecting, by the system, an initial quantum state, being a function of the first quantum operator, into an energy subspace of the first quantum operator, reading out, by the system, of a qubit register a first readout configuration of the energy subspace, and initializing, by the system, another eigenstate projection method employing the first readout configuration as a starting state of the another eigenstate projection method.

That is, a quantum operator can be constructed, akin to the quantum operator-Hamiltonian of Equation 5a. The Hamiltonian quantum operator in this case can be represented by different Hamiltonian Equation 15:

$$H=K+v(x) \tag{15}$$

The possibility to also perform the quantum operator $\exp^{iHt}$ also can be provided, where t can be an arbitrary scalar number.

In brief, a procedure can start from a configuration x that can be encoded into a binary number in the quantum register (e.g., 01101). A set of quantum operations can be performed, represented by a set of quantum gates, that can aim to project the system into the low-energy eigenstate subspace of the Hamiltonian represented by Equation 15. This set of quantum operations can be, for example, realized using the QPE engine 218. Next, the qubit register that encodes the space variable can be read out. With a high probability, the new readout x' (still encoded digitally) can represent a space configuration that can belong to a different local minima of the potential landscape energy function v(x). This can conclude one iteration of the algorithm. Additional iterations can be performed. This can allow for achieving an algorithmic tunnelling and overcoming a cost function energy barrier, such as by using again a fictitious quantum operator H.

Looking particularly to FIG. 6, two iterations of such method are illustrated. At iteration 1, step 1, a start position x is illustrated, such as for instance 00100. A quantum state can be prepared to encode a binary string x. At step 2, a first eigenstate projection quantum method can be run with a suitable effective quantum operator, such as being a Hamiltonian as defined above. As such, the quantum state can encode a super position of many string states that can correspond to the local minima of the cost function. Put another way, after execution of a QPE subroutine, a state prepared in the quantum register can be one of K local eigenstates that can have support over order 0(K) in many local basins of attraction of the real potential v(x). At step 3, the quantum state produced can be read out. For example, the quantum state of only one of the configuration can be read out, which can be selected with a given probability. Because the quantum state can be mainly made of a configuration that belongs to the local minima, with high probability we can draw a new position that is inside a new local minima. At iteration 2, step 1, a new start position x' can be employed based on a readout configuration of the first eigenstate projection quantum method to thereby perform a second eigenstate projection quantum method. A configuration x' readout after wave-function collapse can belong with probability 1−0(1/K) to a different local minima. Each new readout can represent a new iteration of the respective chain. After a selectively determined number of iterations, the configurations in the respective computation space can have been suitably visited.

For example, the spectrum of H at Equation 5a when v(x) is a potential energy surface featuring K metastable minima, can be characterized by K lowest energy eigenstates, separated by a gap of order O(1) by the rest. This feature can be illustrated at plot 300 of FIG. 3 for the double-well potential where K=2, and there are two lowest lying eigenstates, $\psi_0(x)$, and $\psi_1(x)$. While the energy gap Δ (e.g., transition rate) between the two lowest lying eigenstate can be relatively small, the gap with respect to the third (K+1) eigenstate can remain relatively larger, O(1) at each temperature, and barrier height parameter. Moreover, these K eigenstates can be a linear combination of K Gaussian distributions of width √T located at each minima.

The existence of a finite and large gap between the Kth and the $(K+1)^{th}$ eigenenergies can allow for practical implementation of the quantum primitives described above as a sampling tool. Can be simpler to access one or more of these K eigenstates, rather than $|\psi_0\rangle$ exactly, for example, using QPE. After one of these lowest lying states has been prepared, there is order O(1/K) probability that the state collapses into a configuration belonging to each of the K basins of attraction.

In the case of the double-well potential, it can be sufficient to prepare the a quantum state localized in the reactant well $|\psi_L\rangle\approx(|\psi_0\rangle+|\psi_1\rangle)/\sqrt{2}$, than to perform a short QPE subroutine to simply resolve an energy difference of order O(1) (e.g., without the desire to achieve a higher precision of A), to prepare either the state $|\psi_0\rangle$ or $|\psi_1\rangle$. In both cases, this can result in a hopping probability of 50% (e.g., from the left to the right well), because both states can be delocalized across the whole space (see, e.g., FIG. 3, plot 350) readily realizing an exponential speedup (e.g., with respect to an increasing complexity if the energy landscape) as compared to an existing classical local-update sampling method, for instance, based on Langevin dynamics.

To engineer such a global move, classically, one can employ additional information such as the direction and the range of the proposed displacement x→x'.

Turning next to FIGS. 7-9, illustrated is another method, non-limiting method 700, to facilitate performing Boltzmann probability distribution sampling and determining a thermalization rate using quantum computing operations. Repetitive description of like elements and/or processes employed in respective embodiments is omitted for sake of brevity.

First, at FIG. 7 at 702, the non-limiting method 700 can comprise mapping, by a system (e.g., mapping component 110 of hybrid non-limiting system 400) operatively coupled to a processor, a Fokker-Planck equation to a quantum problem comprising a first quantum operator.

At 704, the non-limiting method 700 can comprise based on the mapping, determining, by the system (e.g., quantum computation component 412 of hybrid non-limiting system 400), a second quantum operator as a function of a lowest eigenvalue of the first quantum operator.

At 706, the non-limiting method 700 can comprise determining, by the system (e.g., quantum computation component 412 of hybrid non-limiting system 400), a thermalization rate as a function of the second quantum operator.

At 708, the non-limiting method 700 can comprise encoding, by the system (e.g., encoder component 114 of hybrid non-limiting system 400), a continuous variable of a classical computing problem into a quantum register of a quantum computer, wherein an encoded continuous variable is generated based on the encoding, wherein the quantum problem is generated based on the encoded continuous variable applied to the quantum register, and wherein the quantum register comprises a group of qubits.

At 710, the non-limiting method 700 can comprise performing, by the system (e.g., quantum sampling system 402 of hybrid non-limiting system 400), a quantum computing operation on the encoded continuous variable in the quantum register, wherein the thermalization rate is determined based on the quantum computing operation performed on the encoded continuous variable.

At 712, the non-limiting method 700 can comprise determining, by the system (e.g., quantum sampling system 402 of hybrid non-limiting system 400), a quantum solution to the quantum problem based on the performing of the quantum computing operation on the encoded continuous variable, wherein the quantum solution comprises the thermalization rate.

At 714, the non-limiting method 700 can comprise determining, by the system (e.g., quantum sampling system 402 of hybrid non-limiting system 400), a solution to the classical computing problem based on the quantum solution related to the encoded continuous variable.

Next, FIG. 8 illustrates a continuation of the process diagram of FIG. 7 of an example, non-limiting method 700 that can generally facilitate performing Boltzmann probability distribution sampling and determining a thermalization rate using quantum computing operations. Repetitive description of like elements and/or processes employed in respective embodiments is omitted for sake of brevity.

At 802, the non-limiting method 700 can comprise wherein the first quantum operator is an effective Hamiltonian, determining, by the system (e.g., hybrid non-limiting system 400), a stationary solution of the Fokker-Planck equation as a ground state of the effective Hamiltonian, based on a connection between classical stochastic dynamics and a Schrodinger equation.

At 804, the non-limiting method 700 can comprise wherein the second quantum operator is a supersymmetric Hamiltonian that provides a supersymmetry-based ground state with the lowest eigenvalue based on the effective Hamiltonian, being the first quantum operator, and that provides the ground state, wherein the supersymmetric Hamiltonian is based on a supersymmetric quantum formulation of the Fokker-Planck equation, and wherein determining the thermalization rate comprises determining the thermalization rate as the ground state of the supersymmetric Hamiltonian, determining, by the system (e.g., quantum sampling system 402 of hybrid non-limiting system 400), a reaction rate constant and a saddle point of a reaction based on the supersymmetric Hamiltonian that provides the supersymmetry-based state with the lowest eigenvalue, wherein the reaction rate constant is a function of the thermalization rate.

At 806, the non-limiting method 700 can comprise loading, by the system (e.g., ansatz loader component 116 of hybrid non-limiting system 400), a defined ansatz using a variational process, wherein the defined ansatz is able to minimize a cost function given by an expectation value associated with the effective Hamiltonian in connection with sampling of a Boltzmann probability distribution and a second expectation value associated with the supersymmetric Hamiltonian in connection with the determining of the reaction rate constant, wherein the Boltzmann probability distribution is related to the quantum problem and a classical computing problem corresponding to the quantum problem, and wherein the stationary solution of the Fokker-Planck equation is the Boltzmann probability distribution.

At 808, the non-limiting method 700 can comprise sampling, by the system (e.g., quantum sampling system 402 of hybrid non-limiting system 400), a Boltzmann probability distribution related to the quantum problem and a classical computing problem corresponding to the quantum problem based on the supersymmetric Hamiltonian that provides the supersymmetry-based ground state with the lowest eigenvalue and based on an encoded continuous variable that is associated with the classical computing problem and is applied to a quantum register of a quantum computer, wherein the stationary solution of the Fokker-Planck equation is the Boltzmann probability distribution.

At 810, the non-limiting method 700 can comprise determining, by the system (e.g., quantum sampling system 402 of hybrid non-limiting system 400), a first estimation of a quantum solution to the quantum problem based on the sampling of the Boltzmann probability distribution and the thermalization rate.

Next, FIG. 9 illustrates a continuation of the process diagrams of FIGS. 7 and 8 of an example, non-limiting method 700 that can generally facilitate performing Boltzmann probability distribution sampling and determining a thermalization rate using quantum computing operations. Repetitive description of like elements and/or processes employed in respective embodiments is omitted for sake of brevity.

At 902, the non-limiting method 700 can comprise modifying, by the system(e.g., quantum sampling system 402 of hybrid non-limiting system 400), the first estimation of the quantum solution to the quantum problem based on applying a quantum phase estimation engine (e.g., quantum phase estimation engine 418) to the first estimation of the quantum solution to the quantum problem.

At 904, the non-limiting method 700 can comprise determining, by the system (e.g., quantum sampling system 402 of hybrid non-limiting system 400), a second estimation of the quantum solution to the quantum problem based on the modifying of the first estimation of the quantum solution, wherein the quantum solution to the quantum problem is determined based on the second estimation of the quantum solution to the quantum problem.

At 906, the non-limiting method 700 can comprise reducing, by the system (e.g., quantum sampling system 402 of hybrid non-limiting system 400), and using the quantum phase estimation engine (e.g., quantum phase estimation engine 418) to facilitate solving the quantum problem, an amount of time utilized to determine the thermalization rate by a defined time reduction factor as compared to calculation of the thermalization rate using a classical computer, and wherein the defined time reduction factor ranges from greater than one up to approximately four.

At 908, the non-limiting method 700 can comprise implementing, by the system (e.g., quantum sampling system 402 of hybrid non-limiting system 400), a kinetic portion of the supersymmetric Hamiltonian using a quantum Fourier transform that enables execution of a quantum circuit in polynomial time, and wherein the quantum circuit relates to unitary dynamics relating to the supersymmetric Hamiltonian.

At 910, the non-limiting method 700 can comprise evaluating, by the system (e.g., hybrid non-limiting system 400), the first quantum operator, being a diagonal quantum operator, performing, by the system, a first eigenstate projection quantum method, projecting, by the system (e.g., quantum sampling system 402 of hybrid non-limiting system 400), an initial quantum state, being a function of the first quantum operator, into an energy subspace of the first quantum operator, and reading out, by the system (e.g., hybrid non-limiting system 400), of a qubit register a first readout configuration of the energy subspace.

At 912, the non-limiting method 700 can comprise initializing, by the system (e.g., hybrid non-limiting system 400), another eigenstate projection method employing the first readout configuration as a starting state of the another eigenstate projection method.

For simplicity of explanation, the computer-implemented and non-computer-implemented methodologies provided herein are depicted and/or described as a series of acts. The subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In summary, one or more systems, computer-implemented methods and/or computer program products provided that can facilitate performing Boltzmann probability distribution sampling and determining a thermalization rate using quantum computing operations. A system can comprise a memory that stores computer-executable component, and a processor, operatively coupled to the memory, that executes computer-executable components. The computer-executable components can comprise a mapping component that maps a Fokker-Planck equation to a quantum problem comprising a first quantum operator, and a quantum computation component that, based on the mapping, second quantum operator as a function of a lowest eigenvalue of the first quantum operator, and wherein the quantum computation component further determines a thermalization rate as a function of the second quantum operator.

That is a procedure is provided to sample from a classical Boltzmann distribution using a quantum computer, and comprising reading out a state, variable and/or other result from one or more real-world physical qubits of the quantum computer. A quantum circuit representing the algorithm can be executed in polynomial time, and can provide more accurate sampling than existing classical procedures. Application realms can include chemistry, physics, financial and/or other statistical analysis and/or optimization (e.g., continuous variable cost-functions of optimization problems).

A quantum framework is provided to calculate an associated thermalization rate, using the quantum computer, such as to characterize bio-chemical processes, for example. This implementation can offer a quadratic speedup associated with a quantum system, such as defined in term of "Hamiltonian calls" as compared to classical (e.g., existing) Monte Carlo (MC) estimation.

Quantum hardware can be employed to solve a transformed quantum problem and indicate a polynomially scaling algorithm to realize the transformed quantum problem. A classical distribution can be sampled from and a thermalization rate can be computed associated with the underlying classical diffusive process. Loading of a precomputed distribution can be omitted, because the normalization in all relevant cases can be unknown. Rather, the one or more embodiments described above can allow for sampling from a classical distribution without explicitly knowing the absolute weights pointwise, and/or without assuming a bound on the maximum value of the distribution. The transformed quantum problem is defined in a continuous and evaluatable space, and an aim can be to sample from the distribution and compute the rates, rather than to calculate the partition function (e.g., a scalar number).

With particular reference to protein folding problems, the one or more embodiments described herein can function with real coordinates rather than in an unrealistic latticized space, and/or can allow for sampling from the finite-temperature distribution.

An advantage of the system, computer-implemented method and/or computer program product can be that the classical Boltzmann sampling can be employed to solve a classical problem, modified as a quantum problem, in the quantum realm. That is, using a quantum computer and/or quantum engine, and based on a connection between classical statistical problems and one or more equations, such as the Schrodinger equation, a classical problem can be solved more quickly and/or even at all. The solution and the method to solution can be more efficient, and/or constants computed can be more accurate.

Another advantage of the system, computer-implemented method and/or computer program product can be that a thermalization rate can be computed more quickly employing quantum advantage and using a classical Boltzmann probability distribution.

Furthermore, one or more embodiments described herein can be employed in a real-world system based on the disclosed teachings. For example, one or more embodiments described herein can function within a quantum system that can receive as input a quantum job request based on a classical problem and can measure a real-world qubit state of one or more qubits, such as superconducting qubits, of the quantum system, such as to quantum-wise determine a solution to the classical problem.

The aforementioned one or more embodiments can fill a gap in existing quantum algorithms for sampling applications, such as for sampling from an unnormalized and classical Boltzmann distribution in a continuous space.

Moreover, a device and/or method described herein can be implemented in one or more domains, such as quantum domains, to enable scaled quantum program executions. Indeed, use of a device as described herein can be scalable, such as where a device, system, computer-implemented method and/or computer program product described herein can be employed in quantity to encode, secure and/or obfuscate a plurality of elements of a quantum circuit and/or a plurality of quantum circuits and/or portions thereof, either of which, or a combination of which, can be performed at least partially simultaneously with one another.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to modification of a quantum circuit, as compared to existing systems and/or techniques. Systems, computer-implemented methods and/or computer program products facilitating performance of these processes are of great utility in the field of quantum computing and classical problem evaluation employing quantum computing and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively encode a quantum circuit as the one or more embodiments described herein can facilitate this process. And, neither can the human mind nor a human with pen and paper encode a quantum circuit, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 10:
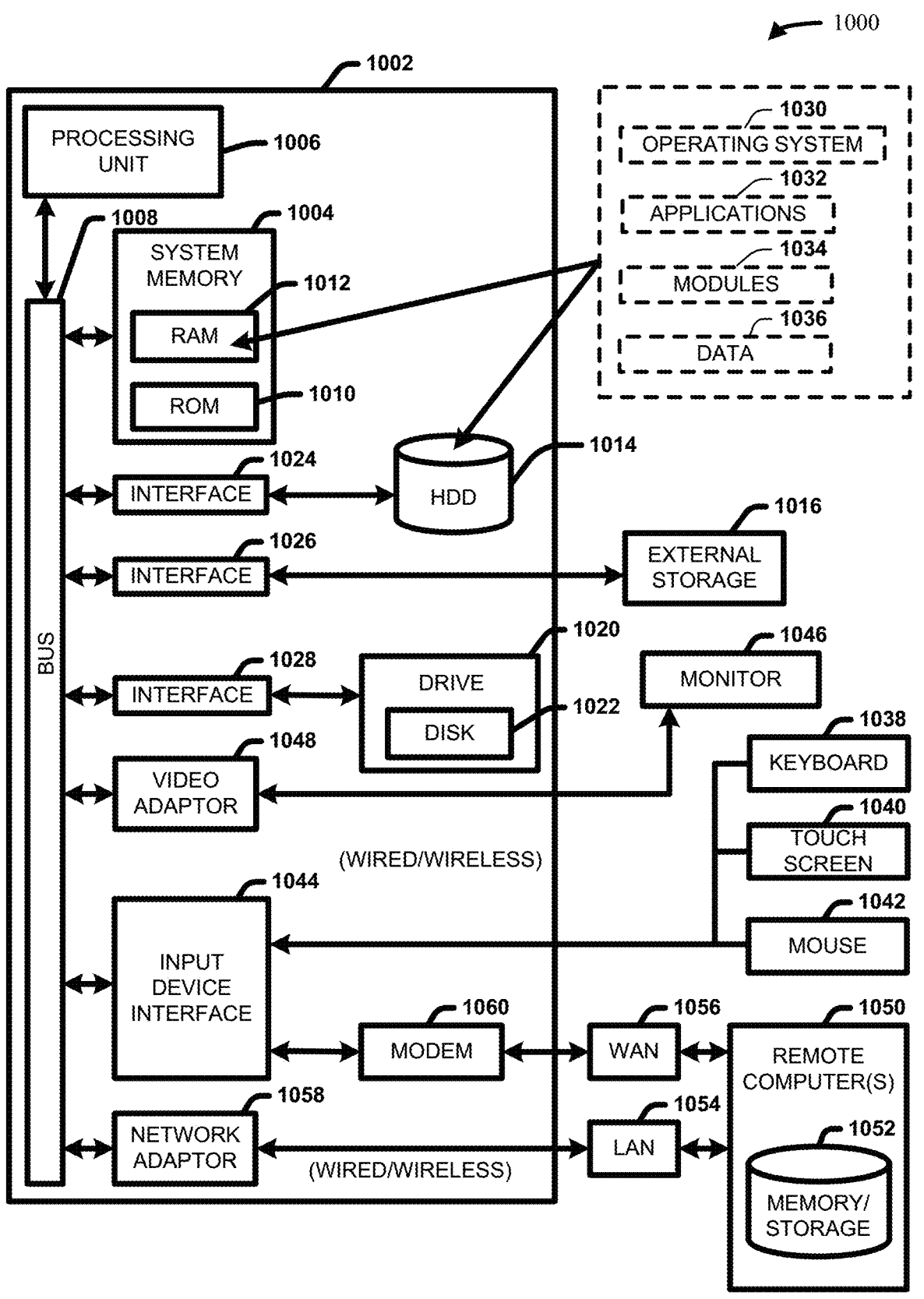
FIG. 10 illustrates a block diagram of an example, non-limiting, operating environment in which one or more embodiments described herein can be facilitated.
Figure 11:
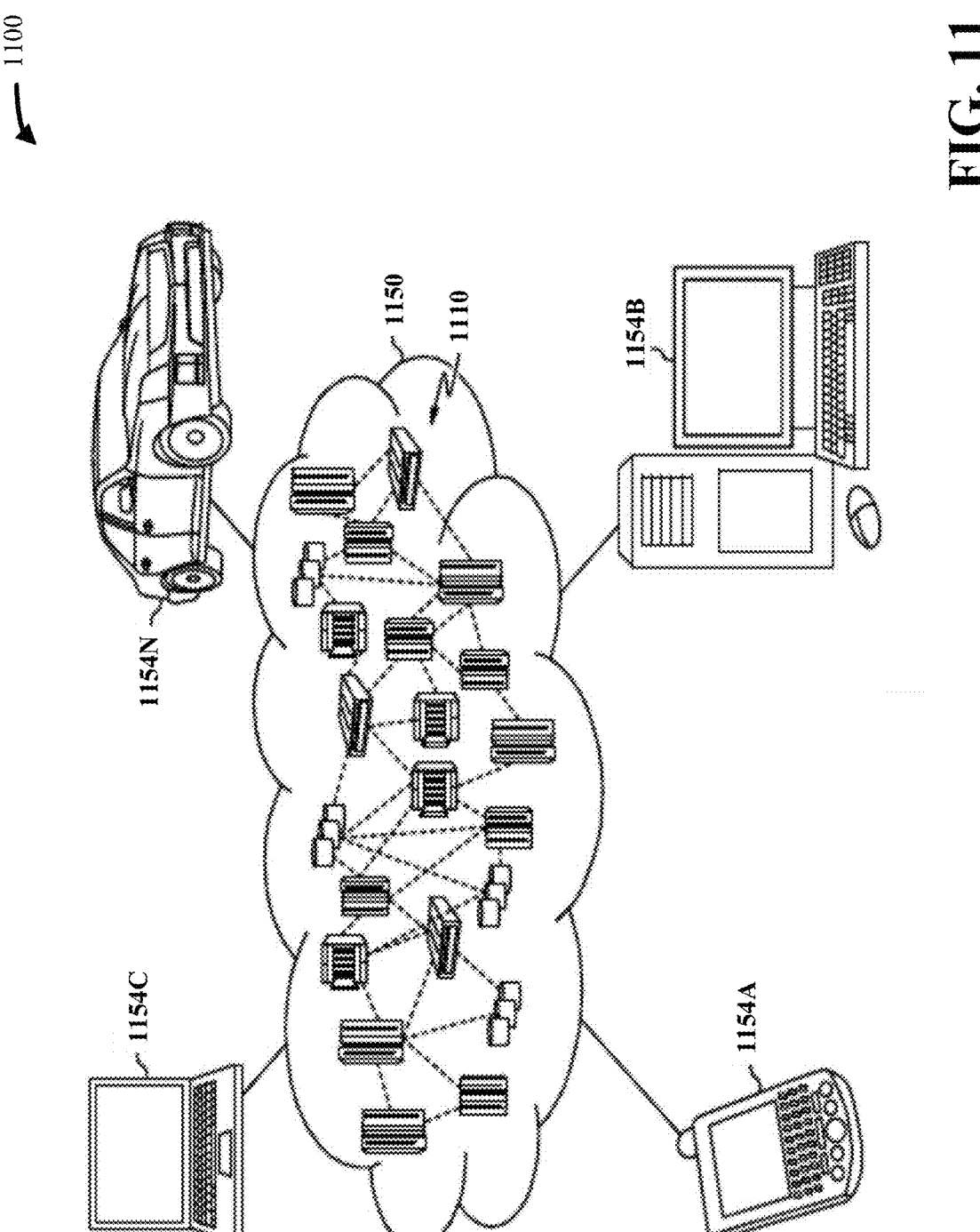
FIG. 11 illustrates a block diagram of an example, non-limiting, cloud computing environment in accordance with one or more embodiments described herein.

Turning next to FIGS. 10-11, a detailed description is provided of additional context for the one or more embodiments described herein at FIGS. 1-9.

FIG. 10 and the following discussion are intended to provide a brief, general description of a suitable operating environment 1000 in which one or more embodiments described herein at FIGS. 1-9 can be implemented. For example, one or more components and/or other aspects of embodiments described herein can be implemented in or be associated with, such as accessible via, the operating environment 1000. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the inventive methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 10, the example operating environment 1000 for implementing one or more embodiments of the aspects described herein can include a computer 1002, the computer 1002 including a processing unit 1006, a system memory 1004 and/or a system bus 1008. One or more aspects of the processing unit 1006 can be applied to processors such as 106 of the non-limiting system 100. The processing unit 1006 can be implemented in combination with and/or alternatively to processors such as 106.

Memory 1004 can store one or more computer and/or machine readable, writable and/or executable components and/or instructions that, when executed by processing unit 1006 (e.g., a classical processor, a quantum processor and/or like processor), can facilitate performance of operations defined by the executable component(s) and/or instruction(s). For example, memory 1004 can store computer and/or machine readable, writable and/or executable components and/or instructions that, when executed by processing unit 1006, can facilitate execution of the one or more functions described herein relating to non-limiting system 100, as described herein with or without reference to the one or more figures of the one or more embodiments.

Memory 1004 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1006 can comprise one or more types of processors and/or electronic circuitry (e.g., a classical processor, a quantum processor and/or like processor) that can implement one or more computer and/or machine readable, writable and/or executable components and/or instructions that can be stored at memory 1004. For example, processing unit 1006 can perform one or more operations that can be specified by computer and/or machine readable, writable and/or executable components and/or instructions including, but not limited to, logic, control, input/output (I/O), arithmetic and/or the like. In one or more embodiments, processing unit 1006 can be any of one or more commercially available processors. In one or more embodiments, processing unit 1006 can comprise one or more central processing unit, multi-core processor, microprocessor, dual microprocessors, microcontroller, System on a Chip (SOC), array processor, vector processor, quantum processor and/or another type of processor. The examples of processing unit 1006 can be employed to implement one or more embodiments described herein.

The system bus 1008 can couple system components including, but not limited to, the system memory 1004 to the processing unit 1006. The system bus 1008 can comprise one or more types of bus structure that can further interconnect to a memory bus (with or without a memory controller), a peripheral bus and/or a local bus using one or more of a variety of commercially available bus architectures. The system memory 1004 can include ROM 1010 and/or RAM 1012. A basic input/output system (BIOS) can be stored in a non-volatile memory such as ROM, erasable programmable read only memory (EPROM) and/or EEPROM, which BIOS contains the basic routines that help to transfer information among elements within the computer 1002, such as during startup. The RAM 1012 can include a high-speed RAM, such as static RAM for caching data.

The computer 1002 can include an internal hard disk drive (HDD) 1014 (e.g., EIDE, SATA), one or more external storage devices 1016 (e.g., a magnetic floppy disk drive (FDD), a memory stick or flash drive reader, a memory card reader and/or the like) and/or a drive 1020, e.g., such as a solid state drive or an optical disk drive, which can read or write from a disk 1022, such as a CD-ROM disc, a DVD, a BD and/or the like. Additionally, and/or alternatively, where a solid state drive is involved, disk 1022 could not be included, unless separate. While the internal HDD 1014 is illustrated as located within the computer 1002, the internal HDD 1014 can also be configured for external use in a suitable chassis (not shown). Additionally, while not shown in operating environment 1000, a solid state drive (SSD) can be used in addition to, or in place of, an HDD 1014. The HDD 1014, external storage device(s) 1016 and drive 1020 can be coupled to the system bus 1008 by an HDD interface 1024, an external storage interface 1026 and a drive interface 1028, respectively. The HDD interface 1024 for external drive implementations can include at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1012, including an operating system 1030, one or more applications 1032, other program modules 1034 and/or program data 1036. All or portions of the operating system, applications, modules and/or data can also be cached in the RAM 1012. The systems and/or methods described herein can be implemented utilizing one or more commercially available operating systems and/or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In a related embodiment, operating system 1030 can comprise one virtual machine (VM) of multiple VMs hosted at computer 1002. Furthermore, operating system 1030 can provide runtime environments, such as the JAVA runtime environment or the .NET framework, for applications 1032. Runtime environments are consistent execution environments that can allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and/or settings for an application.

Further, computer 1002 can be enabled with a security module, such as a trusted processing module (TPM). For instance, with a TPM, boot components hash next in time boot components and wait for a match of results to secured values before loading a next boot component. This process can take place at any layer in the code execution stack of computer 1002, e.g., applied at application execution level and/or at operating system (OS) kernel level, thereby enabling security at any level of code execution.

An entity can enter and/or transmit commands and/or information into the computer 1002 through one or more wired/wireless input devices, e.g., a keyboard 1038, a touch screen 1040 and/or a pointing device, such as a mouse 1042. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be coupled to the processing unit 1006 through an input device interface 1044 that can be coupled to the system bus 1008, but can be coupled by other interfaces, such as a parallel port, an IEEE 1394 serial port, a game port, a USB port, an IR interface, a BLUETOOTH® interface and/or the like.

A monitor 1046 or other type of display device can be alternatively and/or additionally coupled to the system bus 1008 via an interface, such as a video adapter 1048. In addition to the monitor 1046, a computer typically includes other peripheral output devices (not shown), such as speakers, printers and/or the like.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device and/or other common network node, and typically includes many or all of the elements described relative to the computer 1002, although, for purposes of brevity, only a memory/storage device 1052 is illustrated. Additionally, and/or alternatively, the computer 1002 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1054 and/or larger networks, e.g., a wide area network (WAN) 1056. LAN and WAN networking environments can be commonplace in offices and companies and can facilitate enterprise-wide computer networks, such as intranets, all of which can connect to a global communications network, e.g., the Internet.

When used in a LAN networking environment, the computer 1002 can be coupled to the local network 1054 through a wired and/or wireless communication network interface or adapter 1058. The adapter 1058 can facilitate wired and/or wireless communication to the LAN 1054, which can also include a wireless access point (AP) disposed thereon for communicating with the adapter 1058 in a wireless mode.

When used in a WAN networking environment, the computer 1002 can include a modem 1060 and/or can be coupled to a communications server on the WAN 1056 via other means for establishing communications over the WAN 1056, such as by way of the Internet. The modem 1060, which can be internal and/or external and a wired and/or wireless device, can be coupled to the system bus 1008 via the input device interface 1044. In a networked environment, program modules depicted relative to the computer 1002 or portions thereof can be stored in the remote memory/storage device 1052. The network connections shown are merely exemplary and one or more other means of establishing a communications link among the computers can be used.

When used in either a LAN or WAN networking environment, the computer 1002 can access cloud storage systems or other network-based storage systems in addition to, and/or in place of, external storage devices 1016 as described above, such as but not limited to, a network virtual machine providing one or more aspects of storage and/or processing of information. Generally, a connection between the computer 1002 and a cloud storage system can be established over a LAN 1054 or WAN 1056 e.g., by the adapter 1058 or modem 1060, respectively. Upon coupling the computer 1002 to an associated cloud storage system, the external storage interface 1026 can, such as with the aid of the adapter 1058 and/or modem 1060, manage storage provided by the cloud storage system as it would other types of external storage. For instance, the external storage interface 1026 can be configured to provide access to cloud storage sources as if those sources were physically coupled to the computer 1002.

The computer 1002 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 11, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1150 described below with reference to FIG. 11, and/or with reference to the one or more functional abstraction layers (e.g., quantum software and/or the like) described below with reference to FIG. 12, to execute one or more operations in accordance with one or more embodiments described herein. For example, cloud computing environment 1150 and/or one or more of the functional abstraction layers 1260, 1270, 1280 and/or 1290 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both provider and consumer of the service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 1000 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 1000 can be employed to use hardware and/or software to solve problems that are highly technical in nature, that are not abstract and/or that cannot be performed as a set of mental acts by a human.

Referring now to details of one or more aspects illustrated at FIG. 11, the illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C and/or automobile computer system 1154N can communicate. Although not illustrated in FIG. 11, cloud computing nodes 1110 can further comprise a quantum platform (e.g., quantum computer, quantum hardware, quantum software and/or the like) with which local computing devices used by cloud consumers can communicate. Cloud computing nodes 1110 can communicate with one another. They can be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that cloud computing nodes 1110 and cloud computing environment 1150 can communicate with any type of computerized device over any type of network and/or network addressable connection (e.g., using a web browser).

Figure 12:
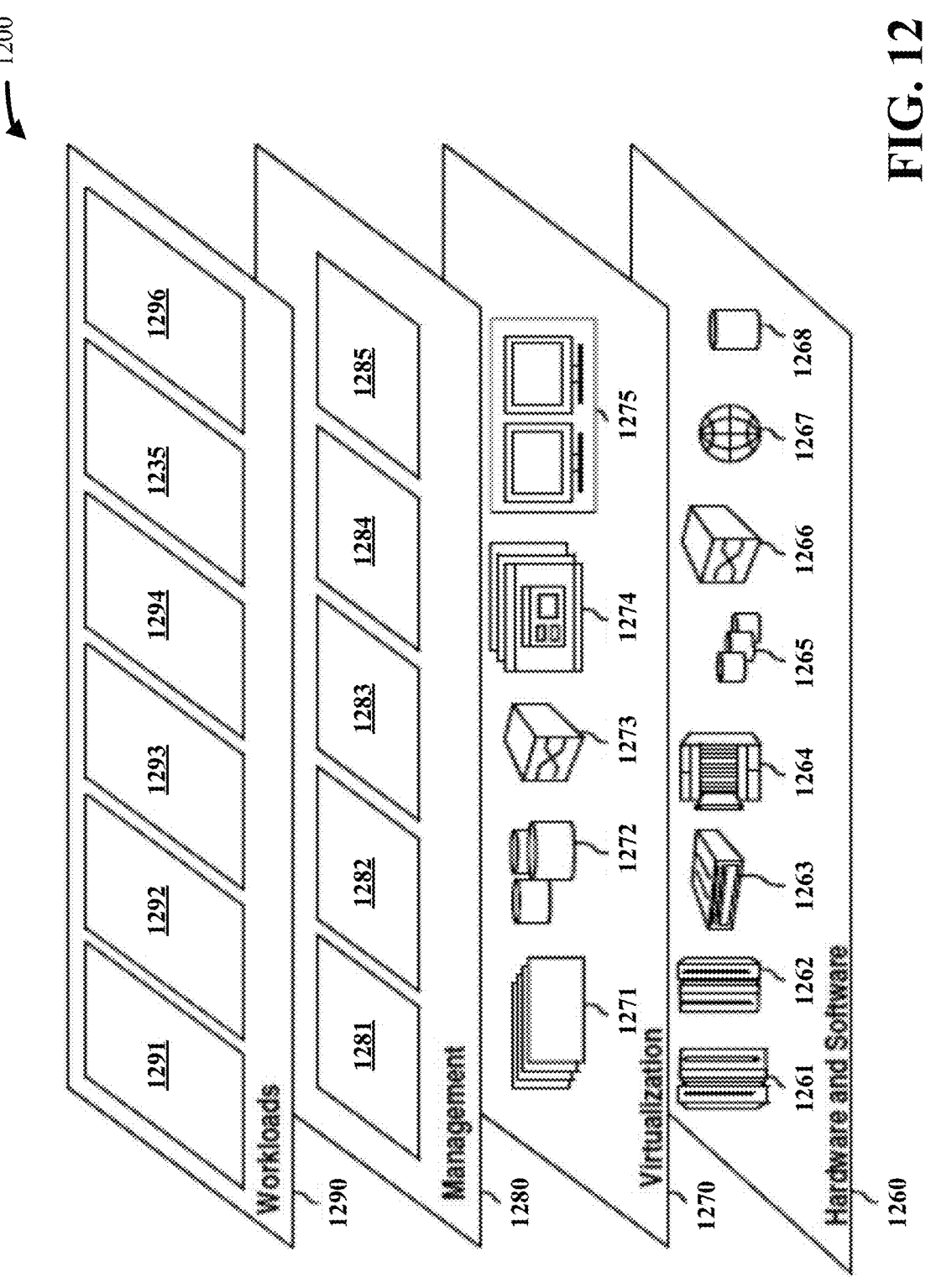
FIG. 12 illustrates a block diagram of example, non-limiting, abstraction model layers in accordance with one or more embodiments described herein.

Referring now to details of one or more aspects illustrated at FIG. 12, a set 1200 of functional abstraction layers is shown, such as provided by cloud computing environment 1150 (FIG. 11). One or more embodiments described herein can be associated with, such as accessible via, one or more functional abstraction layers described below with reference to FIG. 12 (e.g., hardware and software layer 1260, virtualization layer 1270, management layer 1280 and/or workloads layer 1290). It should be understood in advance that the components, layers and/or functions shown in FIG. 12 are intended to be illustrative only and embodiments described herein are not limited thereto. As depicted, the following layers and/or corresponding functions are provided:

Hardware and software layer 1260 can include hardware and software components. Examples of hardware components include: mainframes 1261; RISC (Reduced Instruction Set Computer) architecture-based servers 1262; servers 1263; blade servers 1264; storage devices 1265; and/or networks and/or networking components 1266. In one or more embodiments, software components can include network application server software 1267, quantum platform routing software 1268; and/or quantum software (not illustrated in FIG. 12).

Virtualization layer 1270 can provide an abstraction layer from which the following examples of virtual entities can be provided: virtual servers 1271; virtual storage 1272; virtual networks 1273, including virtual private networks; virtual applications and/or operating systems 1274; and/or virtual clients 1275.

In one example, management layer 1280 can provide the functions described below. Resource provisioning 1281 can provide dynamic procurement of computing resources and other resources that can be utilized to perform tasks within the cloud computing environment. Metering and Pricing 1282 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1283 can provide access to the cloud computing environment for consumers and system administrators. Service level management 1284 can provide cloud computing resource allocation and/or management such that required service levels are met. Service Level Agreement (SLA) planning and fulfillment 1285 can provide pre-arrangement for, and procurement of, cloud computing resources for which a future requirement is anticipated in accordance with an SLA.

Workloads layer 1290 can provide examples of functionality for which the cloud computing environment can be utilized. Non-limiting examples of workloads and functions which can be provided from this layer include: mapping and navigation 1291; software development and lifecycle management 1292; virtual classroom education delivery 1293; data analytics processing 1294; transaction processing 1295; and/or application transformation software 1296.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be coupled to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A computer-implemented method, comprising:
   mapping, by a classical sampling system comprising a classical processor, a Fokker-Planck equation to a quantum problem comprising a first quantum operator;
   generating, by the classical sampling system, a job request associated with the quantum problem;
   based on the mapping and the job request, determining, by a quantum sampling system comprising a quantum processor, a second quantum operator as a function of a lowest eigenvalue of the first quantum operator, wherein the second quantum operator is a supersymmetric Hamiltonian that provides a supersymmetry-based ground state with the lowest eigenvalue based on an effective Hamiltonian, being the first quantum operator, and that provides the supersymmetry-based ground state, wherein the supersymmetric Hamiltonian is based on a supersymmetric quantum formulation of the Fokker-Planck equation, wherein determining the second quantum operator comprises implementing a kinetic portion of the supersymmetric Hamiltonian using a quantum Fourier transform that enables execution of a quantum logic circuit comprising qubits in polynomial time, and wherein the quantum logic circuit relates to unitary dynamics relating to the supersymmetric Hamiltonian; and determining, by the quantum sampling system a thermalization rate as a function of the second quantum operator, wherein determining the thermalization rate comprises determining the thermalization rate as the supersymmetry-based ground state of the supersymmetric Hamiltonian; and determining, by the quantum sampling system, quantum information from which a reaction rate constant and a saddle point of a reaction based on the supersymmetric Hamiltonian that provides the supersymmetry-based ground state with the lowest eigenvalue is subsequently determined.

2. The computer-implemented method of claim 1, further comprising:

encoding, by the classical sampling system a continuous variable of a classical computing problem into a quantum register of the quantum processor, wherein an encoded continuous variable is generated based on the encoding, wherein the quantum problem is generated based on the encoded continuous variable applied to the quantum register, and wherein the quantum register comprises a group of qubits;

performing, by the quantum sampling system a quantum computing operation on the encoded continuous variable in the quantum register, wherein the thermalization rate is determined based on the quantum computing operation performed on the encoded continuous variable; and determining, by the quantum sampling system a quantum solution to the quantum problem based on the performing of the quantum computing operation on the encoded continuous variable, wherein the quantum solution comprises the thermalization rate, and wherein a solution to the classical computing problem is determined based on the quantum solution related to the encoded continuous variable.

3. The computer-implemented method of claim 1, wherein the first quantum operator is the effective Hamiltonian, and wherein the computer-implemented method further comprises:

determining, by the quantum sampling system a stationary solution of the Fokker-Planck equation as a ground state of the effective Hamiltonian, based on a connection between classical stochastic dynamics and a Schrodinger equation.

4. The computer-implemented method of claim 1, further comprising:

loading, by the classical sampling system a defined ansatz using a variational process, wherein the defined ansatz is able to minimize a cost function given by an expectation value associated with the effective Hamiltonian in connection with sampling of a Boltzmann probability distribution and a second expectation value associated with the supersymmetric Hamiltonian in connection with the determining of the reaction rate constant, wherein the Boltzmann probability distribution is related to the quantum problem and a classical computing problem corresponding to the quantum problem, and wherein a stationary solution of the Fokker-Planck equation is the Boltzmann probability distribution.

5. The computer-implemented method of claim 1, further comprising:

sampling, by the quantum sampling system a Boltzmann probability distribution related to the quantum problem and a classical computing problem corresponding to the quantum problem based on the supersymmetric Hamiltonian that provides the supersymmetry-based ground state with the lowest eigenvalue and based on an encoded continuous variable that is associated with the classical computing problem and is applied to a quantum register of the quantum processor, wherein a stationary solution of the Fokker-Planck equation is the Boltzmann probability distribution; and determining, by the quantum sampling system a first estimation of a quantum solution to the quantum problem based on the sampling of the Boltzmann probability distribution and the thermalization rate.

6. The computer-implemented method of claim 5, further comprising:

modifying, by the s quantum sampling system the first estimation of the quantum solution to the quantum problem based on applying a quantum phase estimation engine to the first estimation of the quantum solution to the quantum problem;

determining, by the quantum sampling system a second estimation of the quantum solution to the quantum problem based on the modifying of the first estimation of the quantum solution, wherein the quantum solution to the quantum problem is determined based on the second estimation of the quantum solution to the quantum problem.

7. The computer-implemented method of claim 6, further comprising:

reducing, by the quantum sampling system, using the quantum phase estimation engine to facilitate solving the quantum problem, an amount of time utilized to determine the thermalization rate by a defined time reduction factor as compared to calculation of the thermalization rate using a classical computer, and wherein the defined time reduction factor ranges from greater than one up to approximately four.

8. The computer-implemented method of claim 1, further comprising:

evaluating, by the quantum sampling system, the first quantum operator;

performing, by the quantum sampling system, a first eigenstate projection quantum method;

projecting, by the quantum sampling system, an initial quantum state, being a function of the first quantum operator, into an energy subspace of the first quantum operator;

reading out, by the quantum sampling system, of a qubit register a first readout configuration of the energy subspace; and initializing, by the quantum sampling system, employing the quantum processor, another eigenstate projection method employing the first readout configuration as a starting state of the another eigenstate projection method.

9. A system, comprising:

a classical sampling system comprising a classical processor; and a quantum sampling system comprising a quantum processor; and wherein the classical sampling system is configured to:

map a Fokker-Planck equation to a quantum problem comprising a first quantum operator; and generate a job request associated with the quantum problem; and wherein the quantum sampling system is configured to:

based on the mapping and the job request, determine a second quantum operator as a function of a lowest eigenvalue of the first quantum operator, wherein the second quantum operator is a supersymmetric Hamiltonian that provides a supersymmetry-based ground state with the lowest eigenvalue based on an effective Hamiltonian, being the first quantum operator, and that provides the supersymmetry-based ground state, wherein the supersymmetric Hamiltonian is based on a supersymmetric quantum formulation of the Fokker-Planck equation, wherein determining the second quantum operator comprises implementing a kinetic portion of the supersymmetric Hamiltonian using a quantum Fourier transform that enables execution of a quantum logic circuit comprising qubits in polynomial time, and wherein the quantum logic circuit relates to unitary dynamics relating to the supersymmetric Hamiltonian;

determine a thermalization rate as a function of the second quantum operator, wherein determining the thermalization rate comprises determining the thermalization rate as the supersymmetry-based ground state of the supersymmetric Hamiltonian; and determine quantum information from which a reaction rate constant and a saddle point of a reaction based on the supersymmetric Hamiltonian that provides the supersymmetry-based ground state with the lowest eigenvalue is subsequently determined.

10. The system of claim 9, wherein the classical sampling system is further configured to:

encode a continuous variable of a classical computing problem into a quantum register of the quantum processor of the quantum sampling system, wherein an encoded continuous variable is generated based on the encoding, wherein the quantum problem relates to the classical computing problem, wherein the quantum problem is generated based on the encoded continuous variable applied to the quantum register, and wherein the quantum register comprises a group of qubits.

11. The system of claim 10, wherein the quantum sampling system is further configured to:

perform a quantum computing operation on the encoded continuous variable in the quantum register, wherein the thermalization rate is determined based on the quantum computing operation performed on the encoded continuous variable; and determine a quantum solution to the quantum problem based on the performing of the quantum computing operation on the encoded continuous variable, wherein the quantum solution comprises the thermalization rate, and wherein a solution to the classical computing problem is determined based on the quantum solution related to the encoded continuous variable.

12. The system of claim 9, wherein the first quantum operator is the effective Hamiltonian, and wherein the quantum sampling system is further configured to:

determine a stationary solution of the Fokker-Planck equation as a ground state of the effective Hamiltonian based on a connection between classical stochastic dynamics and a Schrodinger equation.

13. The system of claim 12, wherein the classical sampling system is further configured to:

load a defined ansatz using a variational process, wherein the defined ansatz facilitates mitigating a cost function given by a first expectation value associated with the effective Hamiltonian in connection with sampling of a Boltzmann probability distribution and a second expectation value associated with the supersymmetric Hamiltonian in connection with the determining of the reaction rate constant, wherein the Boltzmann probability distribution is related to the quantum problem and a classical computing problem that corresponds to the quantum problem, and wherein the stationary solution of the Fokker-Planck equation is the Boltzmann probability distribution.

14. The system of claim 12, wherein the quantum sampling system is further configured to:

sample a Boltzmann probability distribution related to the quantum problem and a classical computing problem that corresponds to the quantum problem based on the supersymmetric Hamiltonian that provides the supersymmetry-based ground state with the lowest eigenvalue and based on an encoded continuous variable that is associated with the classical computing problem and is applied to a quantum register of the quantum processor, wherein the stationary solution of the Fokker-Planck equation is the Boltzmann probability distribution; and determine a first estimation of a quantum solution to the quantum problem based on the sampling of the Boltzmann probability distribution and the thermalization rate.

15. The system of claim 14, wherein the quantum sampling system is further configured to:

refine, using a quantum phase estimation engine of the quantum sampling system, the first estimation of the quantum solution to the quantum problem, based on the first estimation of the quantum solution to the quantum problem and a quantum phase estimation function, wherein the quantum phase estimation engine determines a second estimation of the quantum solution to the quantum problem based on the refining of the first estimation of the quantum solution, wherein the second estimation enhances accuracy of estimation of the quantum solution over the first estimation; and determine the quantum solution to the quantum problem based on the second estimation of the quantum solution to the quantum problem.

16. The system of claim 9, wherein the quantum sampling system is further configured to:

evaluate the first quantum operator;

performs a first eigenstate projection quantum method;

project an initial quantum state, being a function of the first quantum operator, into an energy subspace of the first quantum operator;

read out of a qubit register a first readout configuration of the energy subspace; and initialize another eigenstate projection method employing the first readout configuration as a starting state of the another eigenstate projection method.

17. A computer program product that facilitates performing Boltzmann probability distribution sampling and determining a thermalization rate using quantum computing operations, the computer program product comprising a non-transitory computer readable storage medium having program instructions embodied therewith, the program instructions being executable by a system comprising a classical sampling system comprising a classical processor and a quantum sampling system comprising a quantum processor to cause the system to:

map, by the classical sampling system, a Fokker-Planck equation to a quantum problem comprising a first quantum operator;

generate, by the classical sampling system, a job request associated with the quantum problem;

based on the mapping and the job request, determine, by the quantum sampling system, a second quantum operator as a function of a lowest eigenvalue of the first quantum operator;

determine, by the quantum sampling system, the thermalization rate as a function of the second quantum operator;

evaluate, by the quantum sampling system, the first quantum operator;

perform, by the quantum sampling system, a first eigenstate projection quantum method;

project, by the quantum sampling system, an initial quantum state, being a function of the first quantum operator, into an energy subspace of the first quantum operator;

read out, by the quantum sampling system, of a qubit register a first readout configuration of the energy subspace; and initialize, by the quantum sampling system, another eigenstate projection method employing the first readout configuration as a starting state of the another eigenstate projection method.

18. The computer program product of claim 17, wherein the program instructions are further executable by the system to cause the system to:

encode, by the classical sampling system, a continuous variable of a classical computing problem into a quantum register of the quantum processor, wherein an encoded continuous variable is generated based on the encoding, wherein the quantum problem is generated based on the encoded continuous variable applied to the quantum register, and wherein the quantum register comprises a group of qubits;

perform, the quantum sampling system, a quantum computing operation on the encoded continuous variable in the quantum register, wherein the thermalization rate is determined based on the quantum computing operation performed on the encoded continuous variable; and determine, by the quantum sampling system, a quantum solution to the quantum problem based on the performing of the quantum computing operation on the encoded continuous variable, wherein the quantum solution comprises the thermalization rate, and wherein a solution to the classical computing problem is determined based on the quantum solution related to the encoded continuous variable.

19. The computer program product of claim 17, wherein the first quantum operator is an effective Hamiltonian, wherein the second quantum operator is a supersymmetric Hamiltonian that provides a supersymmetry-based ground state with the lowest eigenvalue based on the effective Hamiltonian that provides a ground state, wherein the supersymmetric Hamiltonian is based on a supersymmetric quantum formulation of the Fokker-Planck equation, wherein determining the thermalization rate comprises determining the thermalization rate as the ground state of the supersymmetric Hamiltonian, and wherein the program instructions are further executable by the system to cause the system to:

determine, by the quantum sampling system, a stationary solution of the Fokker-Planck equation as the ground state of the effective Hamiltonian, based on a connection between classical stochastic dynamics and a Schrodinger equation;

determine, by the quantum sampling system, a reaction rate constant and a saddle point of a reaction based on the supersymmetric Hamiltonian that provides the supersymmetry-based ground state with the lowest eigenvalue, wherein the reaction rate constant is a function of the thermalization rate; and sample, by the quantum sampling system, a Boltzmann probability distribution related to the quantum problem and a classical computing problem corresponding to the quantum problem based on the supersymmetric Hamiltonian that provides the supersymmetry-based ground state with the lowest eigenvalue and based on an encoded continuous variable that is associated with the classical computing problem and is applied to a quantum register of the quantum processor, wherein the stationary solution of the Fokker-Planck equation is the Boltzmann probability distribution.

20. The computer program product of claim 17, wherein the program instructions are further executable by the system to cause the system to:

determine, by the quantum sampling system, a first estimation of a quantum solution to the quantum problem based on the sampling of the Boltzmann probability distribution and the thermalization rate.

* * * * *